(12) United States Patent
Konno et al.

(10) Patent No.: US 12,248,159 B2
(45) Date of Patent: Mar. 11, 2025

(54) ELECTRON TUBE, ELECTRON TUBE MODULE, AND OPTICAL DEVICE

(71) Applicant: HAMAMATSU PHOTONICS K.K., Hamamatsu (JP)

(72) Inventors: Rina Konno, Hamamatsu (JP); Shunsuke Kobayashi, Hamamatsu (JP); Ginji Sugiura, Hamamatsu (JP); Junichi Kondo, Hamamatsu (JP); Yasumasa Matsuoka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 231 days.

(21) Appl. No.: 18/009,067

(22) PCT Filed: Apr. 12, 2021

(86) PCT No.: PCT/JP2021/015209
§ 371 (c)(1),
(2) Date: Dec. 8, 2022

(87) PCT Pub. No.: WO2022/014111
PCT Pub. Date: Jan. 20, 2022

(65) Prior Publication Data
US 2023/0296816 A1    Sep. 21, 2023

(30) Foreign Application Priority Data
Jul. 17, 2020   (JP) ................................. 2020-122767

(51) Int. Cl.
*G02B 5/04*   (2006.01)
*G01N 21/64*   (2006.01)
(Continued)

(52) U.S. Cl.
CPC ............... *G02B 5/04* (2013.01); *G01N 21/64* (2013.01); *G02B 21/0076* (2013.01); *H01J 40/16* (2013.01); *H01J 43/08* (2013.01)

(58) Field of Classification Search
CPC ...... G02B 5/04; G02B 21/0076; G01N 21/64; H01J 40/16; H01J 43/08
See application file for complete search history.

(56) References Cited

U.S. PATENT DOCUMENTS

2013/0043378 A1* 2/2013 Schreiber ................ H01J 40/02
250/238
2020/0258725 A1   8/2020 Sugiura et al.

FOREIGN PATENT DOCUMENTS

JP    S41-009931    5/1966
JP    H10-104057 A   4/1998
(Continued)

OTHER PUBLICATIONS

International Preliminary Report on Patentability mailed Jan. 26, 2023 for PCT/JP2021/015209.
(Continued)

*Primary Examiner* — Kevin K Pyo
(74) *Attorney, Agent, or Firm* — Faegre Drinker Biddle & Reath LLP

(57) ABSTRACT

The electron tube includes a vacuum container having a light transmitting substrate, a photocathode provided on an inner surface of the light transmitting substrate, an anode provided in the vacuum container, and a prism. The prism includes a bottom surface bonded to an outer surface of the light transmitting substrate, a light incident surface, and a light reflecting surface configured to further reflect light, which is incident to the photocathode through the prism and the light transmitting substrate and reflected at an interface between the photocathode and the vacuum space, so that the light is re-enter the photocathode. The light reflecting surface has an (Continued)

outwardly convex curved surface shape. The light incident surface is located inward of an imaginary spherical surface that is along the light reflecting surface.

17 Claims, 16 Drawing Sheets

(51) Int. Cl.
    *G02B 21/00*     (2006.01)
    *H01J 40/16*     (2006.01)
    *H01J 43/08*     (2006.01)

(56) References Cited

FOREIGN PATENT DOCUMENTS

| | | |
|---|---|---|
| JP | 2007-184119 A | 7/2007 |
| JP | 2009-277515 A | 11/2009 |
| JP | 2014-522093 A | 8/2014 |
| JP | 2020-129441 A | 8/2020 |
| WO | WO-2013/024123 A1 | 2/2013 |
| WO | WO-2019/094441 A1 | 5/2019 |

OTHER PUBLICATIONS

Hirschfeld, T., "Procedures for Attenuated Total Reflection Study of Extremely Small Samples," Applied Optics, Apr. 1967, vol. 6, No. 4, pp. 715-718.
Oke, J. B., et al., "A Practical Multiple Reflection Technique for Improving the Quantum Efficiency of Photomultiplier Tubes," Applied Optics, vol. 7, No. 4 (1968), pp. 617-622.

* cited by examiner

ELECTRON TUBE, ELECTRON TUBE MODULE, AND OPTICAL DEVICE

TECHNICAL FIELD

The present disclosure relates to an electron tube, an electron tube module, and an optical device.

BACKGROUND ART

Conventionally, an electron tube such as a photomultiplier tube for detecting weak light such as fluorescence generated from a sample has been known. The electron tube includes a vacuum container having a light transmitting substrate and a photocathode provided on an inner surface of the vacuum side of the light transmitting substrate. Non-Patent Document 1 discloses a configuration in which a prism having a semi-spherical surface shape is provided on the outer surface of the light transmitting substrate. In this configuration, light incident to the light incident surface of the prism is reflected at the interface between the photocathode and the vacuum space, and then further reflected at a light reflecting surface opposite to the light incident surface of the prism back to the photocathode. Thus, the quantum efficiency (QE) of the photocathode is improved.

CITATION LIST

Patent Document

[Non-Patent Document 1] J. B. Oke and Rudolph E. Schild. A Practical Multiple Reflection Technique for Improving the Quantum Efficiency of Photomultiplier Tubes. APPLIED OPTICS Vol. 7. No. 4 617-622 (1968)

SUMMARY OF INVENTION

Technical Problem

However, in the configuration disclosed in Non-Patent Document 1, the light incident surface of the prism is along the semi-spherical surface, and the distance between the light incident surface of the prism and the photocathode is relatively large. Therefore, the light source of the detection target light may not be sufficiently close to the photocathode. For example, when the prism has a hemispherical shape, the distance from the light incident surface of the prism to the photocathode is large. Therefore, when the detection target light is divergent light, it is assumed that the detection target light (primary light) does not fit into the photocathode. When the prism has a hemispherical shape, it is difficult for light reflected at a location other than the center of the photocathode (the center of a sphere corresponding to the prism shape) to return to the photocathode again via the light reflecting surface. For this reason, when the detection target light is convergent light, it is preferable to focus the detection target light on the photocathode from the viewpoint of obtaining good quantum efficiency. However, it may be difficult to adjust the focal position as described above because the light source cannot be sufficiently close to the photocathode. Therefore, the configuration disclosed in Non-Patent Document 1 has room for improvement from the viewpoint of improving the quantum efficiency of the photocathode.

Hence, an object of an aspect of the present disclosure is to provide an electron tube, an electron tube module, and an optical device that can effectively improve the quantum efficiency of a photocathode.

Solution to Problem

An electron tube according to an aspect of the present disclosure includes: a vacuum container that includes a light transmitting substrate and forms a vacuum space; a photocathode provided on an inner surface of the light transmitting substrate facing the vacuum space and configured to emit photoelectrons into the vacuum space in response to light incident through the light transmitting substrate; an electron detector provided in the vacuum container and configured to detect electrons derived from the photoelectrons; and a prism bonded to an outer surface of the light transmitting substrate opposite to the inner surface thereof. The prism includes: a bottom surface bonded to the outer surface of the light transmitting substrate; a light incident surface having a light incident portion to which light is incident; and a light reflecting surface configured to further reflect light, which is incident to the light incident portion and reflected at an interface between the photocathode and the vacuum space, so that the light is incident to the photocathode again. The light reflecting surface has an outwardly convex curved surface shape, and the light incident portion is located inward of an imaginary spherical surface that is along the light reflecting surface.

According to the electron tube, light incident from the light incident portion of the prism and reflected by the interface between the photocathode and the vacuum space may be further reflected by the light reflecting surface of the prism and re-incident to the photocathode. As a result, the absorption amount of the detection target light in the photocathode can be increased. Here, since the light reflecting surface has an outwardly convex curved surface shape, it is possible to suitably return the light, which is directed from the photocathode to the light reflecting surface, to the photocathode. Further, since the light incident portion of the prism is located inward of the imaginary spherical surface along the light reflecting surface, the light source can be closer to the photocathode than in the case where the prism is formed in a hemispherical shape (that is, the light incident portion (light incident surface) is formed by the surface of a prism having a semi-spherical surface shape). As a result, in a case where the detection target light is divergent light, it is possible to suppress the detection target light from excessively spreading from the light incident portion to the photocathode, and to suitably cause the detection target light (including light reflected by the light reflecting surface) to be incident to the photocathode. When the detection target light is convergent light, it is easy to adjust the focus of the detection target light to the vicinity of the photocathode. As described above, according to the electron tube, the quantum efficiency of the photocathode can be effectively improved.

The photocathode may be formed in a flat plate shape along the inner surface of the light transmitting substrate. In this case, the photocathode can be easily formed by forming a film on the inner surface of the light transmitting substrate.

The photocathode may be formed on a portion of the inner surface of the light transmitting substrate. In this case, the material cost of the photocathode can be reduced as compared with the case where the photocathode is formed on the entire inner surface of the light transmitting substrate.

The light incident portion may be formed in a flat shape. Thus, for example, the prism can be produced relatively easily by linearly cutting a hemispherical prism member. Note that the light incident portion may have an outwardly convex curved surface shape. Alternatively, the light incident portion may have an inwardly convex curved surface shape.

The light incident portion may be constituted by an entirety of the light incident surface. In this case, since the light incident surface may be configured as a uniform surface, the configuration of the light incident surface may be simplified.

The light incident portion may be constituted by a concave portion opening to a portion of the light incident surface. In this case, the light source can be brought closer to the photocathode by inserting the light source of a light guide such as an optical fiber into the concave portion.

At least the light incident portion of the light incident surface may be provided with an antireflection film. In this case, a reflection loss of the detection target light at the light incident portion (light incident surface) may be effectively reduced by the antireflection film. As a result, the absorption amount of the detection target light in the photocathode can be increased, and the quantum efficiency of the photocathode can be more effectively improved.

The light reflecting surface may be provided with a reflection film. In this case, the reflection film can reduce a transmission loss of light on the light reflecting surface (a component that is transmitted from the light reflecting surface to the outside). Accordingly, it is possible to suppress a decrease in the amount of light reflected by the light reflecting surface and re-incident to the photocathode, and thus to more effectively improve the quantum efficiency of the photocathode.

The prism may further include a pair of side surfaces provided between the light incident surface, the light reflecting surface, and the bottom surface, and facing each other with the light incident surface and the light reflecting surface interposed therebetween when viewed from a direction facing the bottom surface. Such a pair of side surfaces functions as surfaces for supporting (holding) the prism. For example, the operator can hold the prism by holding a pair of side surfaces. Accordingly, for example, it is possible to improve workability when the prism is attached to the light transmitting substrate.

The electron tube may further include an electron multiplying unit provided in the vacuum container to multiply the photoelectrons. Alternatively, the electron detector may be a semiconductor element that multiplies photoelectrons. According to the above configuration, even in a case where the detection target light is weak light (for example, fluorescence, Raman scattering light, or the like which are secondarily generated by irradiating the measurement target sample with excitation light), it is possible to suitably detect electrons corresponding to the detection target light in the electron detector.

The curved surface shape of the light reflecting surface may be a curved surface shape configured in a pseudo manner by a plurality of plane portions. In this case, since the light reflecting surface can be formed only by linearly cutting the prism member, the processing becomes easy.

An electron tube module according to another aspect of the present disclosure includes the electron tube and a casing that accommodates the electron tube. The casing has a wall portion formed with an opening, and the electron tube is arranged in the casing so that light introduced from the opening is incident to the light incident surface.

Since the electron tube module includes the electron tube described above, the same effect as that of the electron tube described above is obtained. Further, by accommodating the electron tube in the casing, it is possible to appropriately protect the electron tube.

The light incident surface may be formed in a flat shape and arranged to be parallel to the wall portion. This makes it possible to easily position the electron tube in the casing.

An optical device according to still another aspect of the present disclosure includes the electron tube and a light source that outputs light with which a measurement target is irradiated. The electron tube is disposed such that detection target light generated by irradiating the measurement target with the light is incident to the light incident surface.

Since the optical device includes the electron tube as a detection unit that detects the detection target light, the same effect as that of the electron tube described above is obtained.

The electron tube may be configured such that a part or all of the detection target light incident to the photocathode through the prism and the light transmitting substrate is totally reflected at an interface between the photocathode and the vacuum space. According to the above configuration, it is possible to increase the absorption amount of the detection target light in the photocathode by the detection target light returning to the photocathode again after being totally reflected, and to effectively improve the quantum efficiency of the photocathode.

Effects of Invention

According to the present disclosure, it is possible to provide an electron tube, an electron tube module, and an optical device that can effectively improve the quantum efficiency of the photocathode.

DESCRIPTION OF EMBODIMENT

Figure 1:
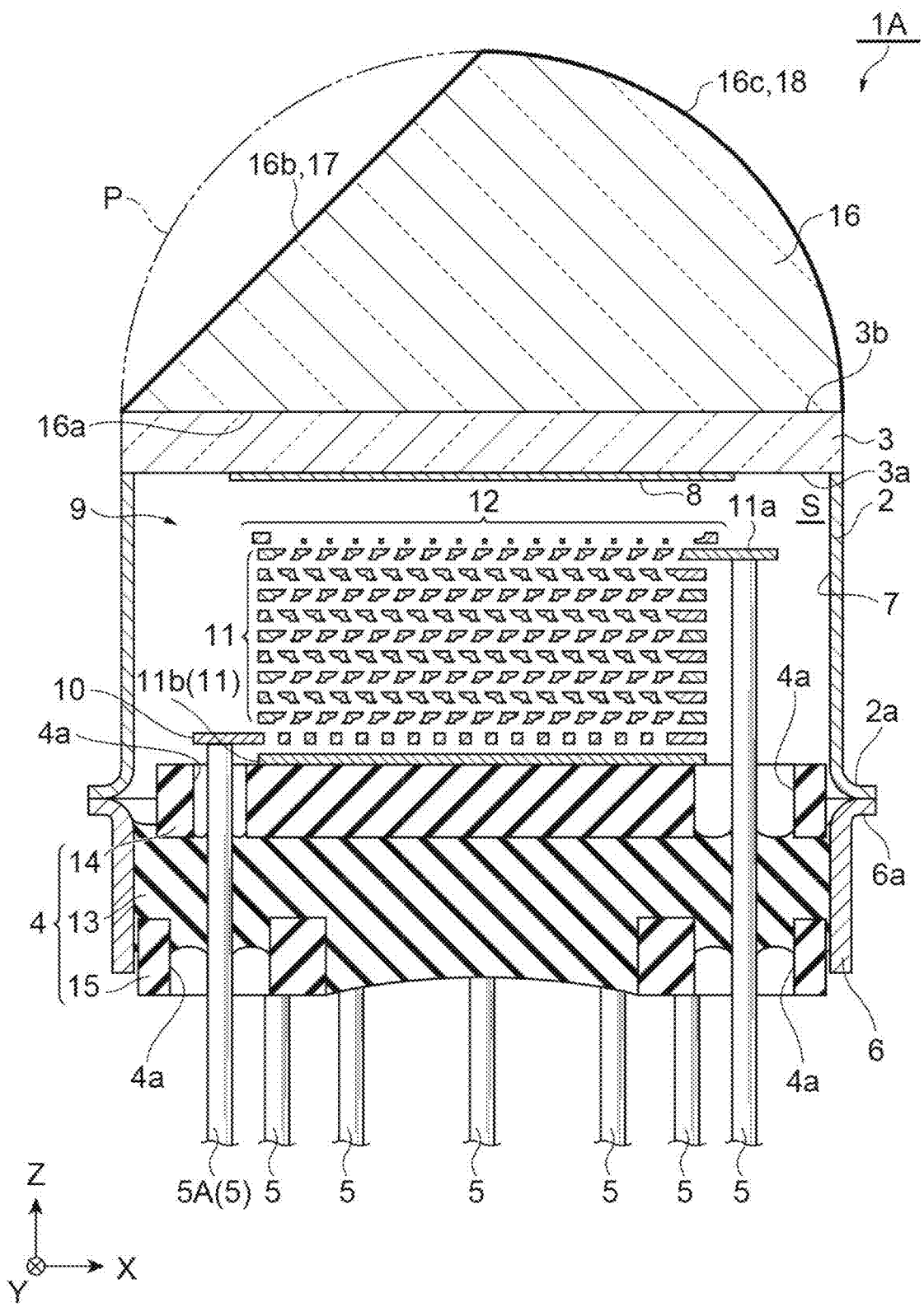
FIG. 1 is a cross-sectional view of an electron tube according to a first embodiment.

Hereinafter, embodiments of the present disclosure will be described with reference to the drawings. In the drawings, the same or corresponding portions are denoted by the same reference numerals, and redundant description will be omitted.

First Embodiment

Figure 2:
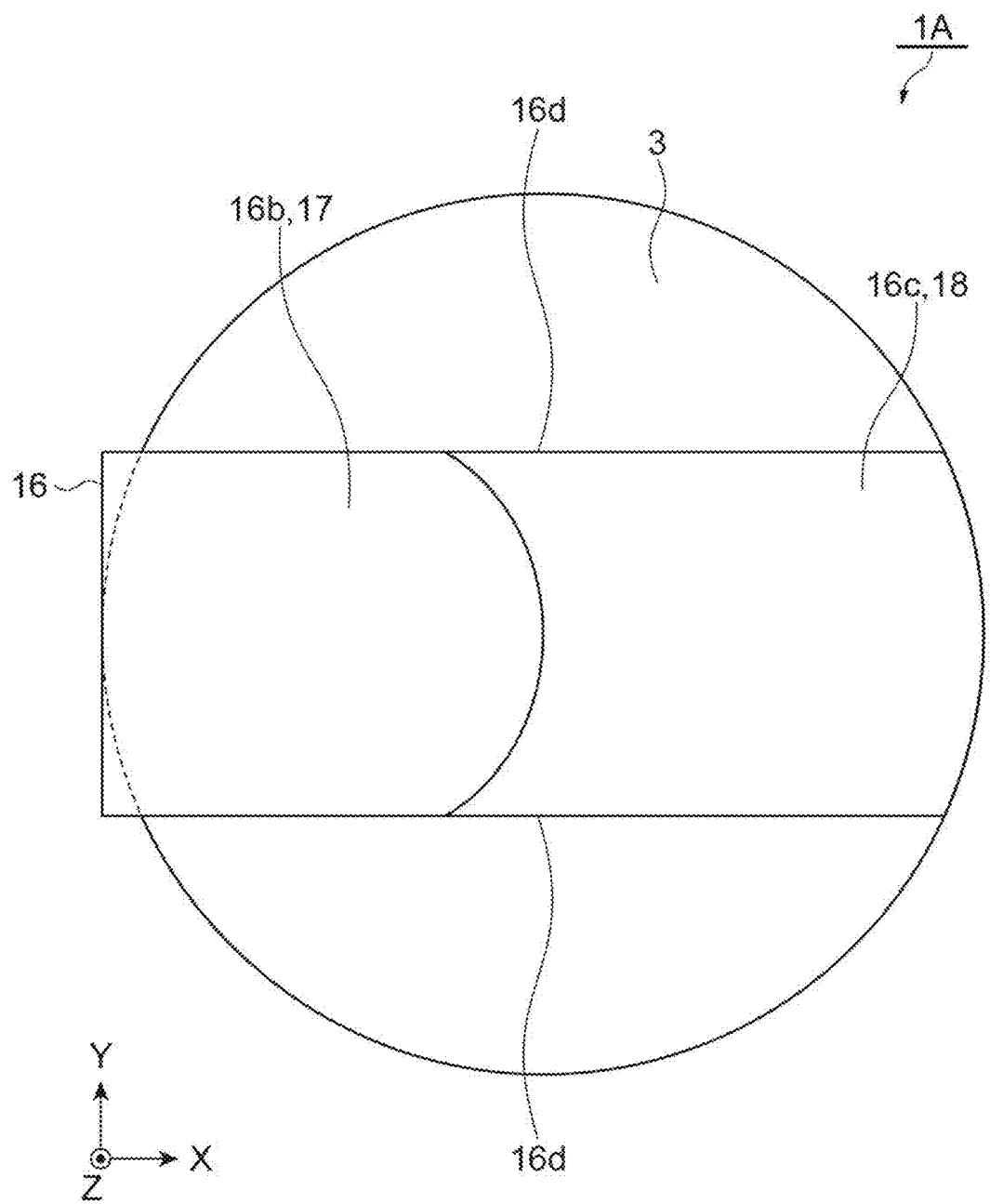
FIG. 2 is a plan view of the electron tube of FIG. 1.

As illustrated in FIGS. 1 and 2, the electron tube 1A according to the first embodiment is a photomultiplier tube having an electron multiplying function (an electron multiplying unit 9 described later). In FIGS. 1 and 2, the Z-axis direction is an extending direction of the electron tube 1A (that is, an extending direction of a side tube 2 described later). The Y-axis direction is a direction in which a pair of side surfaces 16d of the prism 16 described later face each other. The X-axis direction is a direction orthogonal to the Y-axis direction and the Z-axis direction. The X-axis direction is also a direction along an optical axis (central axis) of a detection target light L described later when viewed from the Z-axis direction.

The electron tube 1A includes a metallic side tube 2 having a substantially cylindrical shape. A light transmitting substrate 3 having good light transmittance with respect to incident light (detection target light) is airtightly fixed to an upper end portion of the side tube 2. In the present embodiment, the light transmitting substrate 3 is formed in a disk shape, and a peripheral edge portion of the light transmitting substrate 3 is fixed to the upper end portion of the side tube 2. A disk-shaped stem 4 is disposed at a lower opening end of the side tube 2. A plurality of conductive stem pins 5 which are disposed in the circumferential direction at intervals are airtightly inserted into the stem 4 at the substantially circumferential positions. Each stem pin 5 is inserted through openings 4a formed at the corresponding positions on the upper surface side and the lower surface side of the stem 4. Further, a metallic ring-shaped side tube 6 is airtightly fixed so as to surround the stem 4 from the lateral side. A flange portion 2a formed at the lower end portion of the side tube 2 and a flange portion 6a formed at the upper end portion of the ring-shaped side tube 6 are welded to each other so that the side tube 2 and the ring-shaped side tube 6 are airtightly fixed to each other. In this way, a vacuum container 7 of which an inside is maintained in a vacuum state is formed by the side tube 2, the light transmitting substrate 3, and the stem 4.

A photocathode 8, an electron multiplying unit 9, and an anode 10 (electron detector) are provided in the vacuum container 7. The photocathode 8 is provided on an inner surface 3a of the light transmitting substrate 3 facing the vacuum space S. The photocathode 8 may be provided directly on the inner surface 3a of the light transmitting substrate 3, or may be provided on the inner surface 3a of the light transmitting substrate 3 via an underlayer (for example, oxides such as manganese oxides, magnesium oxides, and titanium oxides). The photocathode 8 emits photoelectrons into the vacuum space S in response to light incident through the light transmitting substrate 3. The photocathode 8 is a so-called transmission type photocathode, and receives light on the upper surface on the light transmitting substrate 3 side and emits photoelectrons from the lower surface on the vacuum space S side. The photocathode 8 may be formed of a material such as GaAsP, GaAs, or InGaAs. Alternatively, the photocathode 8 may be an alkaline antimonide photocathode or an alkaline telluride photocathode.

Here, from the viewpoint of increasing the absorption amount of the detection target light in the photocathode 8, it is preferable that the thickness of the photocathode 8 is large. On the other hand, from the viewpoint of improving the electron emission efficiency from the photocathode 8 to the vacuum space S, it is preferable that the thickness of the photocathode 8 is small. The electron tube 1A can effectively increase the absorption amount of the detection target light in the photocathode 8 by including the prism 16 to be described later, so that the photocathode 8 can be made thinner. In view of the above, when the photocathode 8 is formed of GaAsP, GaAs, or InGaAs, the film thickness of the photocathode 8 may be 3 μm or less. In the case where the photocathode 8 is an alkaline antimonide photocathode or an alkaline telluride photocathode, the thickness of the photocathode 8 may be 0.5 μm or less.

The photocathode 8 is formed in a flat plate shape along the inner surface 3a of the light transmitting substrate 3. In this case, the photocathode 8 can be easily formed by forming a film on the inner surface 3a of the light transmitting substrate 3. The photocathode 8 is formed on a part of the inner surface 3a of the light transmitting substrate 3. As an example, when viewed from the thickness direction (Z-axis direction) of the light transmitting substrate 3, the photocathode 8 is formed in a circular shape having a substantially central position of the light transmitting substrate 3 as a center and a radius smaller than that of the light transmitting substrate 3. That is, the photocathode 8 is not provided at the outer edge portion of the inner surface 3a of the light transmitting substrate 3. In this case, the material cost of the photocathode 8 can be reduced compared to the case where the photocathode 8 is formed on the entire inner surface 3a of the light transmitting substrate 3.

The electron multiplying unit 9 multiplies photoelectrons emitted from the photocathode 8. In this embodiment, the electron multiplying unit 9 is formed in a block shape by stacking a thin plate-shaped dynode plate 11 having a plurality of electron multiplying holes in a plurality of stages and is installed on the upper surface of the stem 4. The edge portion of each dynode plate 11 is provided with a dynode plate connection piece 11a which protrudes outward. A front end portion of a predetermined stem pin 5 inserted and attached to the stem 4 is welded and fixed to the lower surface side of each dynode plate connection piece 11a. Accordingly, each dynode plate 11 is electrically connected to each stem pin 5.

The anode 10 detects electrons derived from photoelectrons emitted from the photocathode 8. Here, electrons derived from photoelectrons emitted from the photocathode 8 may be photoelectrons itself or electrons generated secondarily based on the photoelectrons. In this embodiment, the anode 10 detects secondary electrons (that is, electrons secondarily generated based on photoelectrons emitted from the photocathode 8) multiplied by the electron multiplying unit 9. In this embodiment, the anode 10 is provided at a stage one higher than the dynode plate 11b at the final stage and is configured as a flat plate-shaped anode member for taking out secondary electrons emitted from the dynode plate 11b at the final stage.

A flat plate-shaped converging electrode 12 which converges photoelectrons emitted from the photocathode 8 to the electron multiplying unit 9 is provided between the photocathode 8 and the electron multiplying unit 9. The stem pin 5 is welded and fixed to the converging electrode 12 (not illustrated). Accordingly, the converging electrode 12 is electrically connected to the stem pin 5. Further, one anode pin 5A of the stem pin 5 is welded and fixed to the anode 10. Accordingly, the anode 10 is electrically connected to the anode pin 5A. Then, a voltage is applied by the stem pin 5 connected to a power circuit (for example, the circuit board 41 illustrated in FIG. 8) so that the photocathode 8 and the converging electrode 12 have the same potential and a potential becomes higher as it goes from the upper stage toward the lower stage of each dynode plate 11. Further, a voltage is applied to the anode 10 so that the potential becomes higher than that of the dynode plate 11b at the final stage.

The stem 4 is formed in a three-layer structure by a base material 13, an upper pressing material 14 bonded to the upper side (the inner side) of the base material 13, and a lower pressing material 15 bonded to the lower side (the outer side) of the base material 13. The ring-shaped side tube 6 is fixed to the side surface of the stem 4. In this embodiment, the side surface of the base material 13 and the inner wall surface of the ring-shaped side tube 6 are bonded to each other so that the stem 4 is fixed to the ring-shaped side tube 6.

Figure 3:
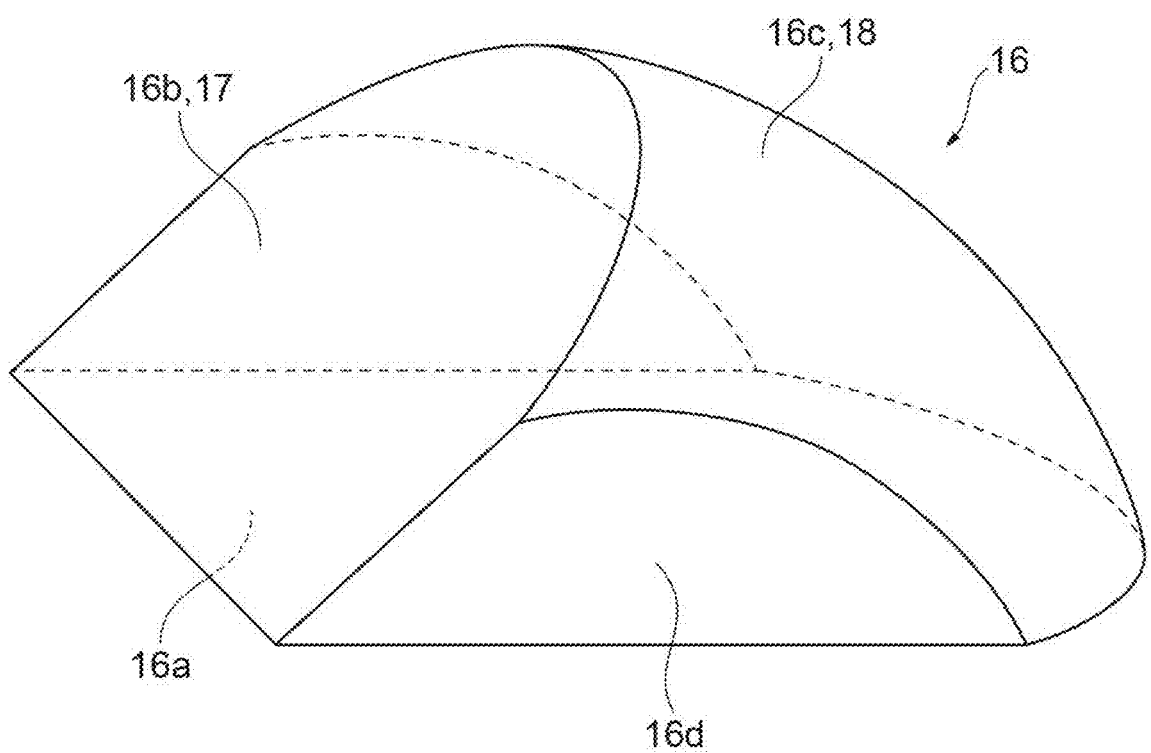
FIG. 3 is a perspective view of a prism included in the electron tube of FIG. 1.

The electron tube 1A includes the prism 16 which is a transparent structure outside the vacuum container 7. The prism 16 is bonded to the outer surface 3a of the light transmitting substrate 3 opposite to the inner surface 3b. As illustrated in FIGS. 1 to 3, the prism 16 includes a bottom surface 16a, a light incident surface 16b, a light reflecting surface 16c, and a pair of side surfaces 16d. The material of the prism 16 is, for example, acrylic resin, glass, or the like.

The bottom surface 16a is a surface bonded to the outer surface 3b of the light transmitting substrate 3. The bottom surface 16a and the outer surface 3b of the light transmitting substrate 3 may be adhered to each other by an optical adhesive. Alternatively, the bottom surface 16a and the outer surface 3b of the light transmitting substrate 3 may be joined together by an optical contact. The bottom surface 16a is formed in a flat shape (flat surface). The bottom surface 16a is formed in a substantially rectangular shape. A light incident surface 16b is connected to one end of the bottom surface 16a in the longitudinal direction (X-axis direction). A light reflecting surface 16c is connected to the other end of the bottom surface 16a in the longitudinal direction. The side surfaces 16d are connected to each of both ends of the bottom surface 16a in the lateral direction (Y-axis direction).

The longitudinal length of the bottom surface 16a is approximately equal to a diameter of the light transmitting substrate 3. As shown in FIG. 2, when viewed from the direction perpendicular to the bottom surface 16a (Z-axis direction), the positions of both ends of the bottom surface 16a in the longitudinal direction coincide with the positions of the edges of the light transmitting substrate 3. Since one end of the bottom surface 16a in the longitudinal direction (i.e., the end connected to the light incident surface 16b) is not located inside the edge of the light transmitting substrate 3, the light incident surface 16b and the inner surface 32c of the ceiling wall 32 of the casing 31 can be brought into contact with each other when the electron tube 1A is disposed in the casing 31 of the electron tube module 30 described later (see FIG. 8). However, if it is not necessary to dispose the electron tube 1A in the casing 31 as described above, the end portion of the bottom surface 16a connected to the light incident surface 16b may be located inside the edge portion of the light transmitting substrate 3. In this embodiment, as an example, one end of the bottom surface 16a in the longitudinal direction has a rectangular corner portion. On the other hand, the other end in the longitudinal direction of the bottom surface 16a is formed in an arc shape along the edge portion of the light transmitting substrate 3 because the light reflecting surface 16c connected to the other end has a curved surface shape.

The light incident surface 16b is a surface to which the detection target light L (see FIG. 4) is incident. The light incident surface 16b is formed in a flat surface. When viewed from the lateral direction (Y-axis direction) of the bottom surface 16a, the light incident surface 16b is inclined with respect to the bottom surface 16a. The angle between the bottom surface 16a and the light incident surface 16b is an acute angle. In the present embodiment, the entire light incident surface 16b constitutes a light incident portion to which the detection target light L is incident.

An antireflection film 17 is provided on the light incident surface 16b. By providing the antireflection film 17 so as to cover the light incident surface 16b, it is possible to effectively reduce the reflection loss of the detection target light in the light incident surface 16b. The antireflection film 17 may be a single-layer film or a multilayer film. When the antireflection film 17 is formed as a single-layer film, the antireflection film 17 may be formed by $MgF_2$ or the like, for example. When the antireflection film 17 is formed as a multilayer film, the antireflection film 17 may be formed of, for example, $TiO_2$, $Ta_2O_5$, SiO2, $Al_2O_3$, $MgF_2$, or the like. As a film forming method of the antireflection film 17, for example, a technique such as vacuum deposition or sputtering may be used.

The light reflecting surface 16c functions as a reflecting portion that further reflects light, which is incident to the photocathode 8 through the prism 16 and the light transmitting substrate 3 and reflected by the interface between the photocathode 8 and the vacuum space S, thereby allowing the light to be incident to the photocathode 8 again. The light reflecting surface 16c is formed in an outwardly convex curved surface shape. For example, the light reflecting surface 16c is formed in a dome shape (a curved surface shape such as a spherical surface shape or a parabolic surface shape).

Here, the virtual line in FIG. 1 indicates an imaginary spherical surface P along the light reflecting surface 16c. When the light reflecting surface 16c has a curved surface shape other than the spherical surface shape, the virtual spherical surface P is a spherical surface approximated to the light reflecting surface 16c, and does not need to completely overlap with the light reflecting surface 16c. The light incident surface 16b is located inside the imaginary spherical surface P. In other words, in this embodiment, the light incident surface 16b is not smoothly continuous with the light reflecting surface 16c. That is, the light incident surface 16b is located further inward than if the light incident surface were configured as a smooth continuous surface with the light reflecting surface 16c. With the above-described configuration, the distances between the light incident surface 16b and the photocathode 8 are shorter than in the case where the prism is simply formed in a hemispherical shape.

The light reflecting surface 16c is provided with a reflection film 18 for improving reflectivity of light. The reflection film 18 may be formed of, for example, aluminum, an aluminum-based alloy, silver, a silver-based alloy, gold, or a dielectric multilayer film.

A pair of side surfaces 16d is provided between the light incident surface 16b, the light reflecting surface 16c, and the bottom surface 16a. The pair of side surfaces 16d faces each other across the light incident surface 16b and the light reflecting surface 16c when viewed from the direction (Z-axis direction) facing the bottom surface 16a. More particularly, one side surface 16d is provided so as to connect one end portion of the light incident surface 16b in the Y-axis direction, one end portion of the light reflecting surface 16c in the Y-axis direction, and one end portion of the bottom surface 16a in the Y-axis direction. The other side surface 16d is provided so as to connect the other ends of the light incident surface 16b and the light reflecting surface 16c in the Y-axis direction and the other end of the bottom surface 16a in the Y-axis direction. Each side surface 16d is a surface intersecting the Y-axis direction. In the present embodiment, each side surface 16d is orthogonal to the Y-axis direction and extends along the XZ plane. Such a pair of side surfaces 16d functions as surfaces for supporting (holding) the prism 16. In addition, positioning of the center of the prism 16 is facilitated by the pair of side surfaces 16d. In addition, the pair of side surfaces 16d may be used as surfaces for fixing the electron tube 1A (prism 16) to a casing when modularizing the electron tube 1A. For example, the operator can hold the prism 16 by holding the pair of side surfaces 16d. Accordingly, for example, it is possible to improve workability when the prism 16 is attached to the light transmitting substrate 3.

Figure 4:
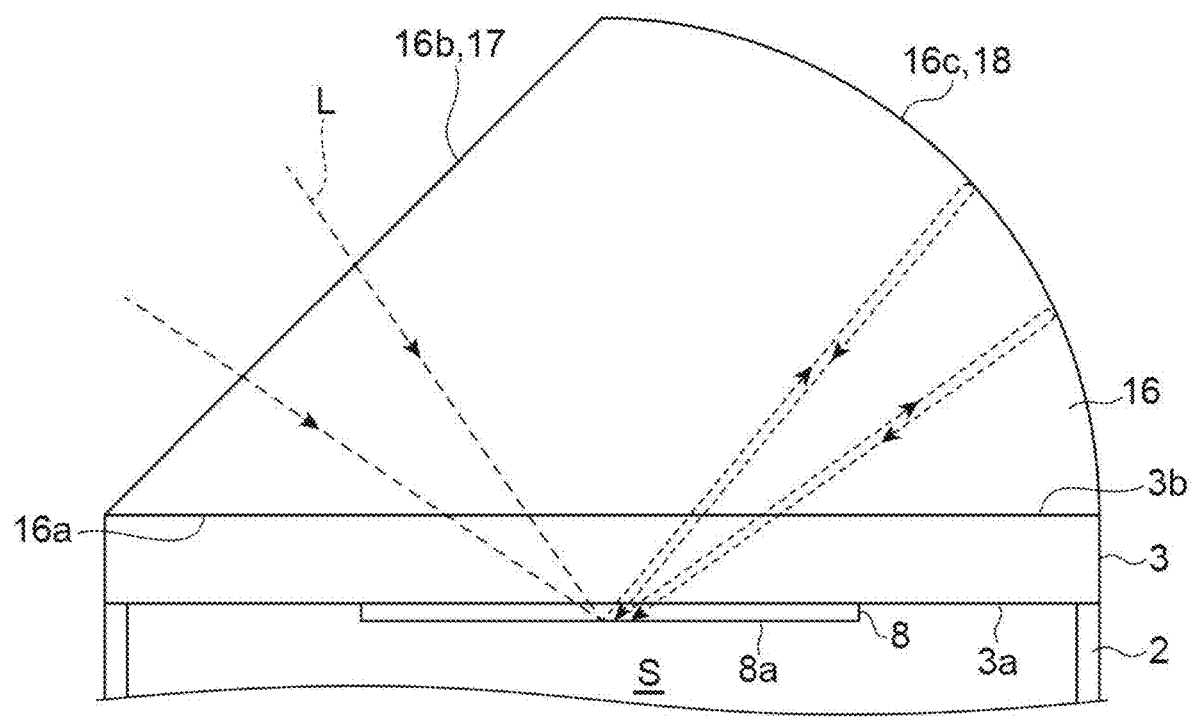
FIG. 4 is a schematic diagram showing an optical path of detection target light in the electron tube of FIG. 1.

The principle of improving the quantum efficiency of the photocathode 8 by the prism 16 will be described with reference to FIG. 4. FIG. 4 schematically illustrates a part of the side tube 2, the light transmitting substrate 3, the photocathode 8, and the prism 16 among the components of the electron tube 1A. As shown in FIG. 4, the detection target light L is light directed to the light incident surface 16b of the prism 16. The detection target light L may be parallel light or non-parallel light. In the example of FIG. 4, the detection target light L is light (non-parallel light) collected by a lens or the like (not shown) so as to have a focal point substantially at the center of the photocathode 8.

As shown in FIG. 4, the detection target light L enters the photocathode 8 through the prism 16 and the light transmitting substrate 3. In the present embodiment, the electron tube 1A is disposed with respect to the optical axis of the detection target light L such that a part or all of the detection target light L is totally reflected at the interface between the inner surface 8a on the vacuum space S side of the photocathode 8 and the vacuum space S (i.e., such that equation (3) described later is satisfied). In this case, the detection target light L is totally reflected at the interface between the inner surface 8a of the photocathode 8 and the vacuum space S, and travels toward the light reflecting surface 16c of the prism 16. The detection target light L is reflected by the light reflecting surface 16c of the prism 16 provided with the reflection film 18, and is directed to the photocathode 8 again. When the light reflecting surface 16c is formed in a perfect semi-spherical surface shape, most of the light reflected by the light reflecting surface 16c may not return to the photocathode 8. Therefore, the radius of curvature of the light reflecting surface 16c may be set in accordance with an assumed angle of incident light (light incident to the light incident surface 16b) or the like. That is, the radius of curvature of the light reflecting surface 16c may be optimized such that the incident efficiency (incident amount) of the light reflected by the light reflecting surface 16c to the photocathode 8 is maximized. More specifically, in order to allow most of the light totally reflected at the interface between the photocathode 8 and the vacuum space S to re-enter the photocathode 8, the curvature, position, size, and the like of the light reflecting surface 16c may be designed in accordance with the convergence angle or divergence angle of the light incident to the light incident surface 16b, or the incident light diameters on the photocathode 8.

Figure 5:
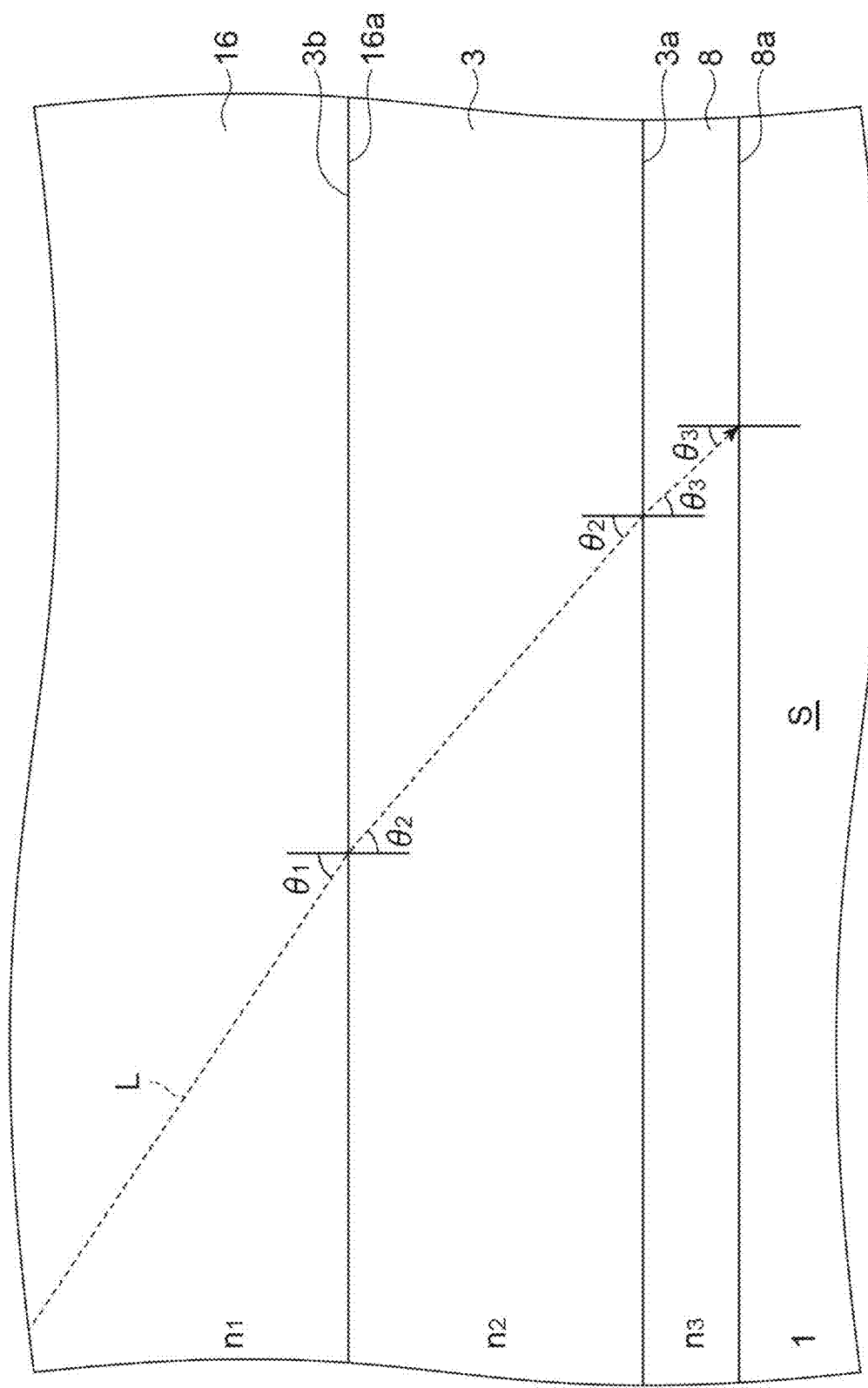
FIG. 5 is a schematic diagram for explaining conditions for total reflection of detection target light at an interface between a photocathode and a vacuum space.

Referring to FIG. 5, a condition that a part or all of the detection target light L is totally reflected at the interface between the inner surface 8a of the photocathode 8 and the vacuum space S will be described. Here, the refractive index of the prism 16 is set to $n_1$ ($>1$), the refractive index of the light transmitting substrate 3 is set to $n_2$ ($>1$), and the refractive index of the photocathode 8 is set to $n_3$ ($>1$). The refractive index of the vacuum space S is 1. Further, the incident angle of the detection target light L incident from the prism 16 to the light transmitting substrate 3 is set to $\theta_1$, the incident angle of the detection target light L incident from the light transmitting substrate 3 to the photocathode 8 is set to $\theta_2$, and the incident angle of the detection target light L incident from the photocathode 8 to the vacuum space S is set to $\theta_3$. Further, the critical angle of the detection target light L incident from the photocathode 8 to the vacuum space S (a minimum incident angle in which a total reflection occurs at the interface between the photocathode 8 and the vacuum space S) is set to $\theta_0$. In this case, the following equations (1) and (2) are established. Then, a condition that the detection target light L is totally reflected at the interface between the inner surface 8a of the photocathode 8 and the vacuum space S is expressed by the equation (3). Thus, in order to totally reflect the detection target light L at the interface between the inner surface 8a of the photocathode 8 and the vacuum space S, the electron tube 1A may be disposed with respect to the optical axis of the detection target light L so that $\theta_3$ determined based on the incident angle $\theta_1$ with respect to the light transmitting substrate 3 of the detection target light L satisfies the following equation (3). Note that it is not always necessary that all components of the detection target light L satisfy the following expression (3). Even when the arrangement or the like of the electron tube 1A is adjusted so that a part of the detection target light L satisfies the following expression (3), it is possible to improve the incident efficiency of light to the photocathode 8.

$$n_1 \sin \theta_1 = n_2 \sin \theta_2 = n_3 \sin \theta_3 \ldots \quad (1)$$

$$n_3 \sin \theta_0 = 1 \ldots \quad (2)$$

$$\theta_3 \geq \theta_0 \ldots \quad (3)$$

According to the electron tube 1A described above, light incident from the light incident portion (in the present embodiment, light incident surface 16b) of the prism 16 and reflected by the interface between the photocathode 8 and the vacuum space S may be further reflected by the light reflecting surface 16c of the prism 16 and may be incident to the photocathode 8 again. As a result, the absorption amount of the detection target light L in the photocathode 8 can be increased. Here, since the light reflecting surface 16c has an outwardly convex curved surface shape, it is possible to suitably return the light, which is directed from the photocathode 8 toward the light reflecting surface 16c, to the photocathode 8. Further, since the light incident portion (light incident surface 16b) of the prism 16 is located inward of the imaginary spherical surface P along the light reflecting surface 16c, the light source can be brought closer to the photocathode 8 than in the case where the prism 16 is formed in a hemispherical shape (that is, the light incident portion is formed by the surface of a prism having a semi-spherical surface shape). As a result, in a case where the detection target light L is divergent light, it is possible to suppress the detection target light L from excessively spreading from the light incident surface 16b to the photocathode 8, and to suitably cause the detection target light L (including light reflected by the light reflecting surface 16c) to be incident to the photocathode 8. When the detection target light L is convergent light, it is easy to adjust the focus of the detection target light L to the vicinity of the photocathode 8. As described above, according to the electron tube 1A, the quantum efficiency of the photocathode 8 can be effectively improved.

In addition, the light incident portion (light incident surface 16b) is formed in a flat shape (flat surface). Thus, the prism 16 can be produced relatively easily by linearly cutting a hemispherical prism member, for example. In addition, in the electron tube module 30 described later, it is possible to easily perform positioning of the electron tube 1A.

The light incident portion is constituted by an entirety of the light incident surface 16b. In this case, since the light incident surface 16b can be configured as a uniform surface (a flat surface in the present embodiment), the configuration of the light incident surface 16b can be simplified. That is, since it is not necessary to process a special region for allowing light to be incident on a part of the light incident surface 16b, it is possible to easily process the light incident surface 16b.

The light incident surface 16b is provided with the antireflection film 17. In this case, the antireflection film 17 can effectively reduce the reflection loss of the detection target light L in the light incident surface 16b. That is, it is possible to reduce the ratio of the light reflected on the light incident surface 16b without being transmitted through the prism 16 in the detection target light L. Thus, the absorption amount of the detection target light L in the photocathode 8 can be increased, and the quantum efficiency of the photocathode 8 can be effectively improved.

The light reflecting surface 16c is provided with the reflection film 18. The reflection film 18 can reduce a transmission loss of light in the light reflecting surface 16c (components transmitted from the light reflecting surface 16c to the outside). As a result, it is possible to suppress a decrease in the amount of light reflected by the light reflecting surface 16c and incident to the photocathode 8 again, and thus it is possible to effectively improve the quantum efficiency of the photocathode 8.

The electron tube 1A includes the electron multiplying unit 9 provided in the vacuum container 7 to multiply the photoelectrons emitted from the photocathode 8. Accordingly, even in a case where the detection target light L is weak light (for example, fluorescence, Raman scattering light, or the like which are secondarily generated by irradiating the measurement target sample with excitation light), it is possible to suitably detect electrons corresponding to the detection target light L in the anode 10.

Second Embodiment

Figure 6:
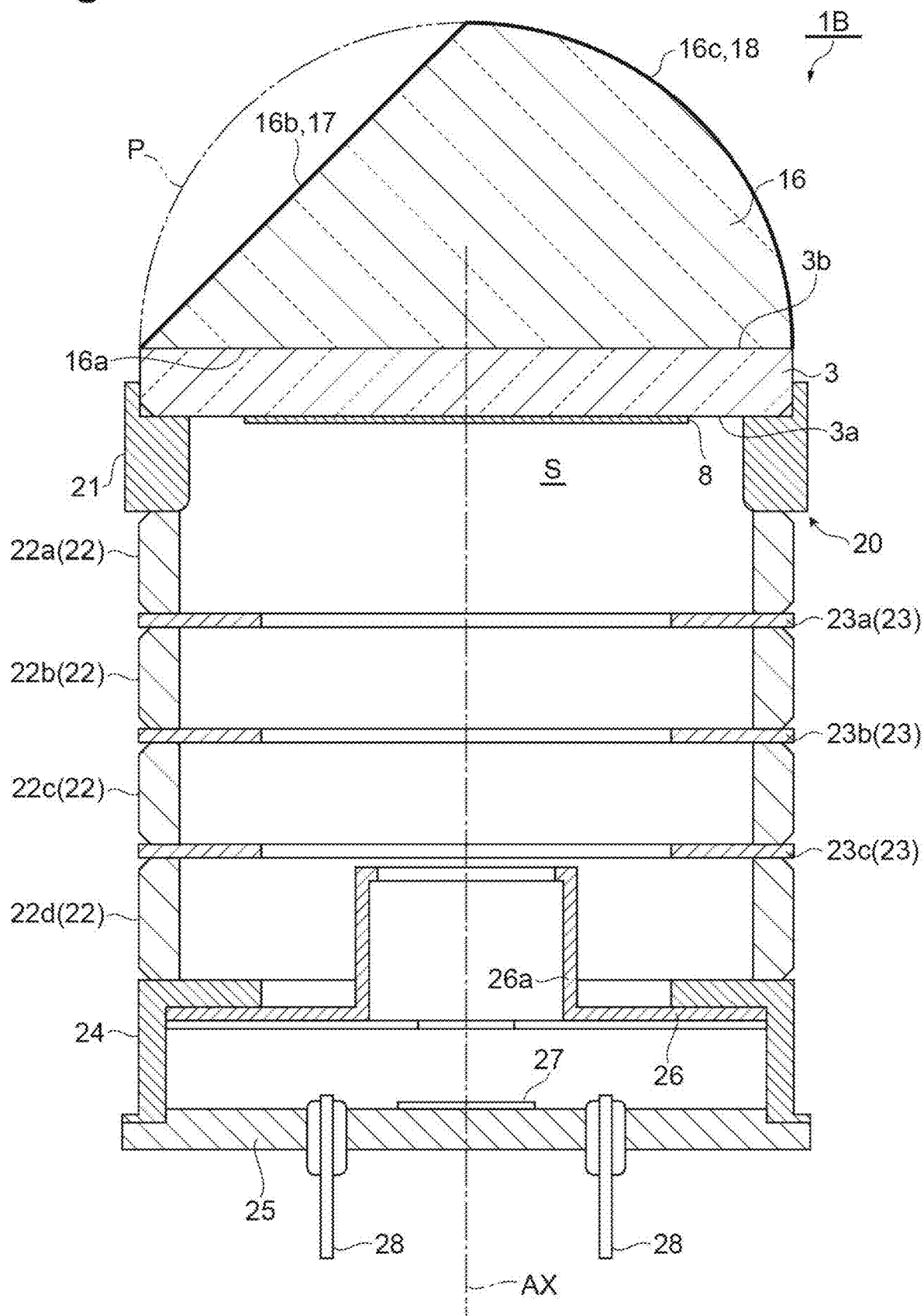
FIG. 6 is a cross-sectional view of an electron tube according to a second embodiment.

As shown in FIG. 6, the electron tube 1B of the second embodiment has a configuration different from that of the electron tube 1A in the structure for multiplying photoelectrons emitted from the photocathode 8 (that is, a structure inside the vacuum container). In the configuration of the electron tube 1B, the configurations of the light transmitting substrate 3, the photocathode 8, the prism 16, the antireflection film 17, and the reflection film 18 are the same as those of the electron tube 1A. The electron tube 1B is a so-called electron-bombarded multiplication type photo-detector (hybrid photo-detector (HPD)) which accelerates photoelectrons emitted from the photocathode 8 in response to the incidence of light and obtains a high gain in the semiconductor element so that weak light can be detected.

As illustrated in FIG. 6, the electron tube 1B includes a vacuum container 20 of which an inside is maintained in a vacuum state. In this embodiment, as an example, the vacuum container 20 includes the light transmitting substrate 3, a cylindrical cathode electrode 21, a cylindrical side plate 22 which is formed of an insulation material such as ceramic, an annular intermediate electrode 23a which is fixed so as to be sandwiched between a first side plate 22a and a second side plate 22b formed by dividing the side plate 22 into four parts, an annular intermediate electrode 23b which is fixed so as to be sandwiched between the second side plate 22b and a third side plate 22c, an annular intermediate electrode 23c which is fixed so as to be sandwiched between the third side plate 22c and a fourth side plate 22d, a metal flange 24, and a disk-shaped stem 25 which is airtightly connected to the metal flange 24. The light transmitting substrate 3, the cathode electrode 21, the side plate 22, the intermediate electrode 23, the metal flange 24, and the stem 25 are stacked and arranged concentrically.

The side plate 22 is provided between the cathode electrode 21 and the metal flange 24. One end of the side plate 22 is airtightly bonded to the end surface of the cathode electrode 21 by brazing or the like. The other end of the side plate 22 is airtightly bonded to the metal flange 24 provided in the outer periphery of the stem 25 by brazing or the like. Further, the intermediate electrodes 23a, 23b, and 23c are formed in a ring shape having an opening portion centered on the central axis AX of the vacuum container 20 and are arranged electrically independently from the photocathode 8 at a predetermined interval along the inner wall of the side plate 22. Here, the outer diameters of the cathode electrode 21, the side plate 22, and the cylindrical portions of the metal flange 24 are substantially the same and the inner diameter of the cathode electrode 21 is smaller than the inner diameter of the side plate 22. Thus, the inner wall surface of the cathode electrode 21 is located inside in relation to the inner wall surface of the side plate 22 from one end to the other end of the cathode electrode 21 along the central axis AX. In contrast, the inner diameters of the opening portions of the intermediate electrodes 23a, 23b, and 23c are made as small as possible within a range that does not interfere with the electron trajectory, that is, a range that does not become extremely small compared to the diameter of the photocathode 8 and the intermediate electrodes 23a, 23b, and 23c protrude inward in relation to the cathode electrode 21 from the inner wall surface of the cylindrical side plate 22. Accordingly, the charging of the side plate 22 by stray electrons when controlling the trajectory of electrons emitted from the photocathode 8 and the influence on the electron trajectory due to the charging can be eliminated. The intermediate electrodes 23a, 23b, and 23c are fixed by brazing or the like while being sandwiched between the side plates 22 so as to be integrated with the side plates 22.

Further, a ring-shaped rising electrode 26 is fixed to the side of the central axis AX of the metal flange 24 of the vacuum container 20. The rising electrode 26 has an opening of a diameter smaller than those of the intermediate electrodes 23a, 23b, and 23c while being disposed concentrically with the metal flange 24. The opening forms a substantially columnar front end portion 26a extending along the inner wall of the side plate 22 toward the light transmitting substrate 3.

A semiconductor element 27 (electron detector) including avalanche photodiode (APD) is fixed onto a surface on the side of the vacuum space S in the stem 25 so as to face the photocathode 8. The APD is a semiconductor element which bonds a P region and an N region of a high concentration and forms an electric field high enough for avalanche amplification. When an electron incident surface which is a surface of the semiconductor element 27 is irradiated with photoelectrons emitted from the photocathode 8, the semiconductor element 27 multiplies the photoelectrons to be converted into an electrical signal and outputs the signal to the outside through a pin 28 provided through the stem 25.

As described above, in the electron tube 1B, the semiconductor element 27 having a function of multiplying photoelectrons serves as an electron detector. According to the above-described configuration, it is possible to appropriately detect electrons in response to the detection target light in the semiconductor element 27 even when the detection target light is weak light. Further, in the electron tube 1B, since the semiconductor element 27 serving as the electron detector has an electron multiplying function, there is no need to provide the electron multiplying unit 9 in the electron tube 1A of the first embodiment. Furthermore, a detailed structure of the electron tube 1B is not limited to the above-described example. For example, a part of the intermediate electrode 23 may be omitted and the rising electrode 26 may be omitted.

[Electron Tube Module]

Figure 7:
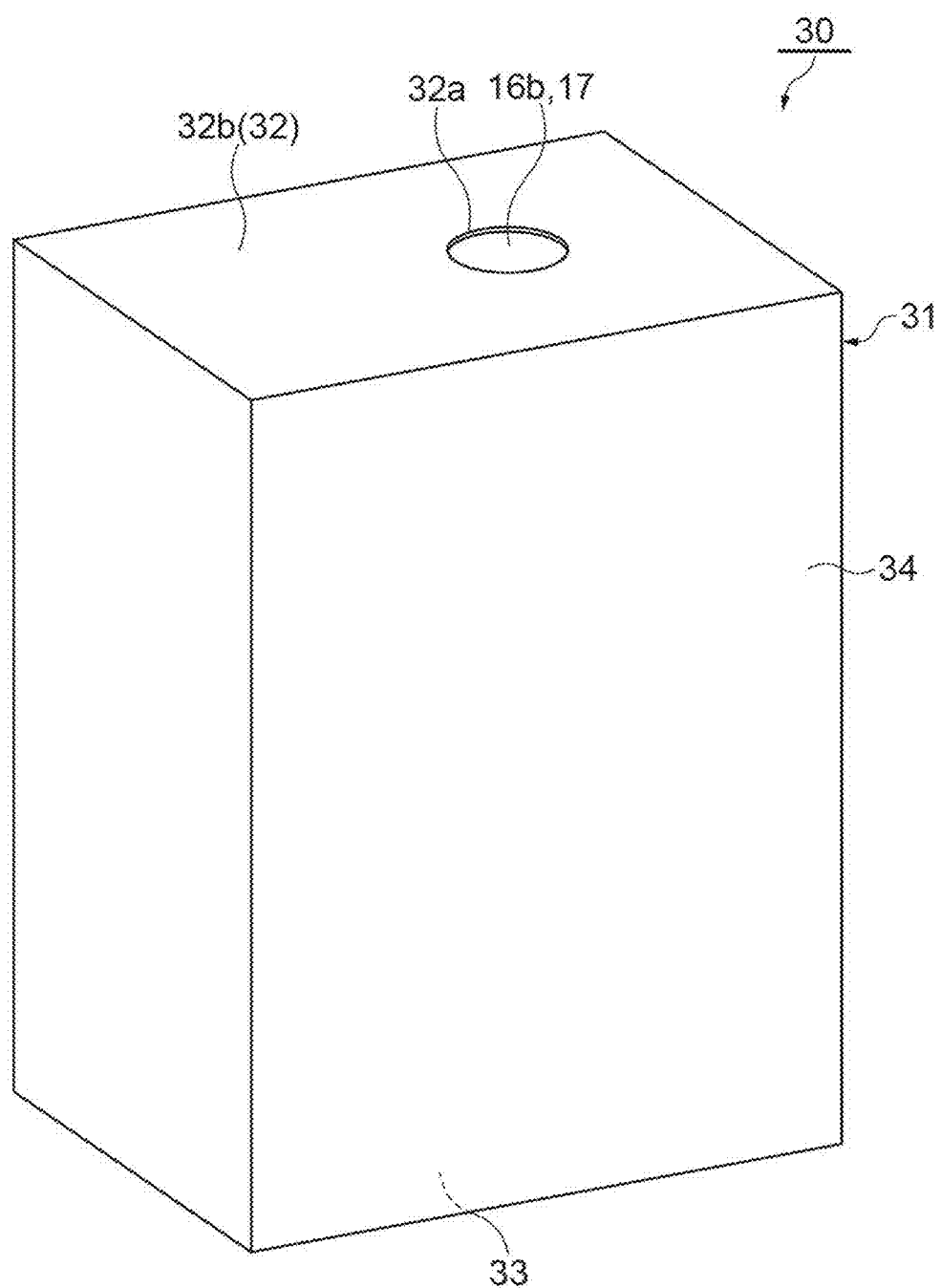
FIG. 7 is a perspective view of an electron tube module according to an embodiment.

An electron tube module 30 including the above-described electron tube (here, as an example, an electron tube 1A) will be described with reference to FIGS. 7 and 8. The electron tube module 30 includes an electron tube 1A and a casing 31 that accommodates the electron tube 1A. The casing 31 is formed in a substantially rectangular parallelepiped shape. The casing 31 is formed of, for example, metal or resin. The casing 31 has a ceiling wall 32 (wall portion), a bottom wall 33, and a side wall 34. The ceiling wall 32 and the bottom wall 33 face each other in a direction along the central axis AX1 of the casing 31. The ceiling wall 32 and the bottom wall 33 are formed in rectangular plate shapes having the same size as viewed from the direction along the central axis AX1. The side wall 34 is formed in a square tubular shape extending along the central axis AX1, and connects an edge portion of the ceiling wall 32 and an edge portion of the bottom wall 33.

Figure 8:
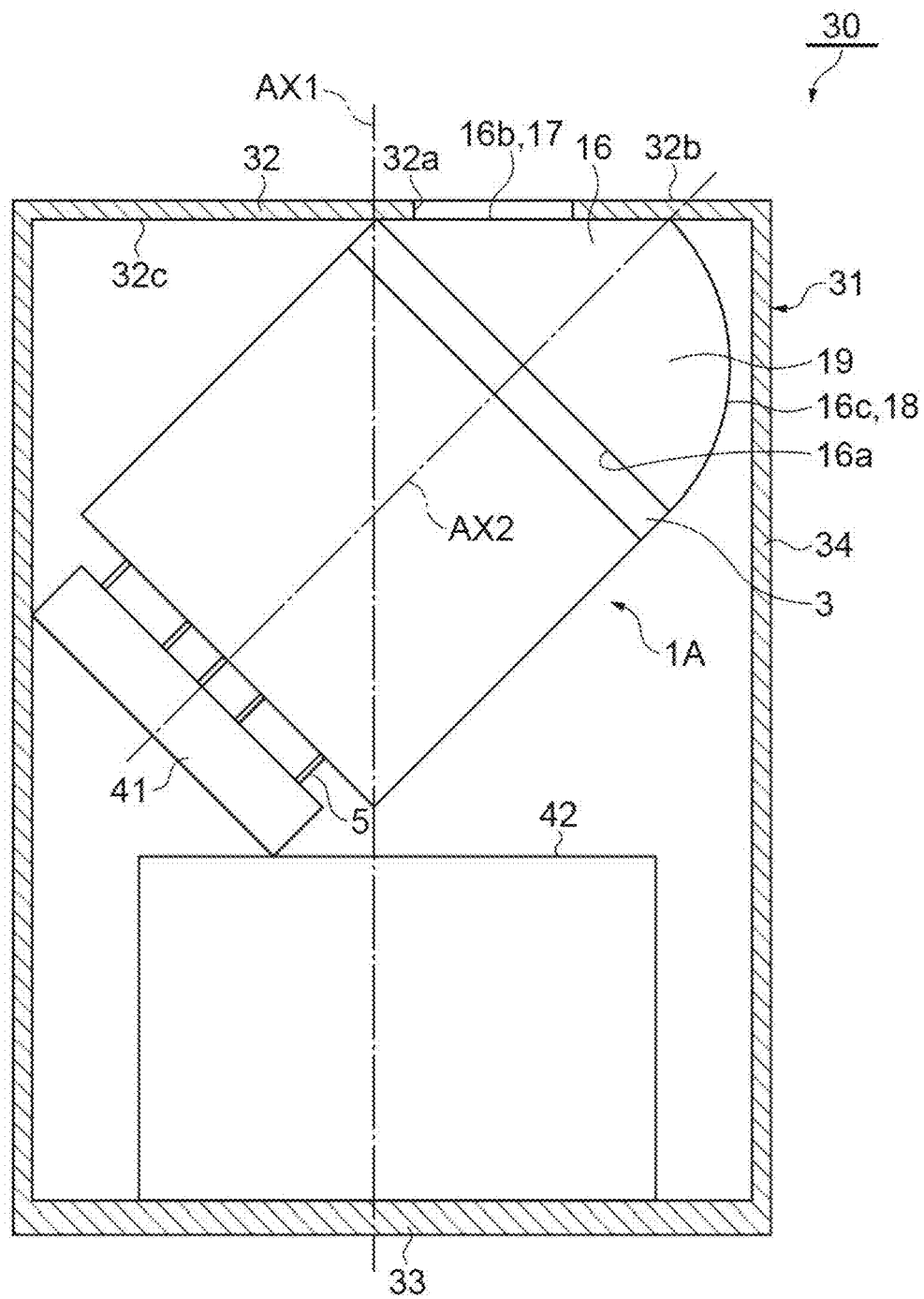
FIG. 8 is a partial cross-sectional view of the electron tube module.

As shown in FIG. 8, in the present embodiment, a circuit board 41 for supplying a voltage to the electron tube 1A via the stem pin 5, and a booster circuit 42 connected to the circuit board 41 and generating a high voltage to be supplied to the electron tube 1A are housed in the casing 31 together with the electron tube 1A. The electron tube 1A is disposed and fixed in the casing 31 such that a central axis AX2 (an axial line parallel to the Z-axis in FIG. 1) of the electron tube 1A is inclined with respect to the central axis AX1 of the casing 31.

An opening 32a for guiding the detection target light to the electron tube 1A in the casing 31 is formed in the ceiling wall 32. The opening 32a extends from the outer surface 32b to the inner surface 32c of the ceiling wall 32. In the present embodiment, the opening 32a is formed in a circular shape when viewed from a direction along the central axis AX1.

The electron tube 1A is arranged in the casing 31 so that the light introduced from the opening 32a enters the light incident surface 16b. As an example, the electron tube 1A is disposed in the casing 31 such that the light incident surface 16b of the prism 16 is parallel to the ceiling wall 32 and at least a portion of the light incident surface 16b of the prism 16 is exposed to the outside through the opening 32a. The light incident surface 16b of the prism 16 abuts the inner surface 32c of the ceiling wall 32. Accordingly, it is possible to easily and accurately position the electron tube 1A in the casing 31 such that the light incident surface 16b and the ceiling wall 32 (inner surface 32c) are parallel to each other.

If the end of the bottom surface 16a (the end on the side connected to the light incident surface 16b) is located inside the edge of the light transmitting substrate 3 when viewed from the direction along the central axis AX2, the edge of the light transmitting substrate 3 interferes with the ceiling wall 32, so that a gap is formed between the light incident surface 16b and the inner surface 32c of the ceiling wall 32. In such a case, a spacer member for filling the gap may be disposed between the inner surface 32c of the ceiling wall 32 and the light incident surface 16b. Alternatively, the inner surface 32c of the ceiling wall 32 and the light incident surface 16b may be brought into contact with each other by making the ceiling wall 32 thicker in a portion corresponding to the gap than in other portions.

In this embodiment, the light incident surface 16b of the prism 16 is joined to the inner surface 32c of the ceiling wall 32. The light incident surface 16b and the inner surface 32c may be joined by, for example, an adhesive. As the adhesive, for example, a glass bonding adhesive such as a silicone-based adhesive may be used. Here, in order to improve compatibility between the inner surface 32c and the glass bonding adhesive, a primer suitable for the material of the inner surface 32c may be applied to the inner surface 32c in advance. In this case, after the primer coated on the inner surface 32c is dried, the inner surface 32c coated with the primer and the light incident surface 16b are bonded to each other by the glass bonding adhesive. Alternatively, an adhesive having good compatibility with the material of the inner surface 32c may be used as the adhesive. In this case, in order to improve compatibility between the light incident surface 16b and the adhesive, a primer for glass may be applied to the light incident surface 16b in advance. However, it is not essential to use a primer as described above. As described above, since the prism 16 of the electron tube 1A is fixed to the ceiling wall 32, it is possible to suitably prevent the positional deviation of the electron tube 1A with respect to the ceiling wall 32. The entire portion of the light incident surface 16b that comes into contact with the inner surface 32c may be bonded to the inner surface 32c, or a portion of the light incident surface 16b that comes into contact with the inner surface 32c may be bonded to the inner surface 32c. Further, the light incident surface 16b does not necessarily need to be joined to the inner surface 32c of the ceiling wall 32, and the electron tube 1A may be fixed to the casing 31 in a portion other than the light incident surface 16b.

Since the electron tube module 30 described above includes the electron tube 1A, an effect similar to that of the electron tube 1A described above is obtained. In addition, by accommodating the electron tube 1A in the casing 31, the electron tube 1A can be appropriately protected. In addition, since the light incident surface 16b formed in a flat shape is disposed so as to be parallel to the ceiling wall 32, positioning of the electron tube 1A in the casing 31 is facilitated. For example, by bringing the light incident surface 16b into contact with the inner surface 32c of the ceiling wall 32 as described above, it is possible to easily position the electron tube 1A. In addition, by adjusting the position of the electron tube module 30 so that the ceiling wall 32 is orthogonal to the optical axis of the detection target light, it is possible to easily and appropriately arrange the electron tube module 30. In addition, since the central axis AX1 of the casing 31 and the optical axis of the detection target light are parallel to each other, it is possible to arrange the electron tube module 30 in a natural orientation in a well-fitting manner in an optical system including the electron tube module 30 (optical device 50A to 50C described later or the like).

[Optical Device]

Next, the optical devices 50A to 50C including the electron tube (here, as an example, the electron tube module 30 including the electron tube 1A) will be described with reference to FIGS. 9 to 11.

First Example of Optical Device

Figure 9:
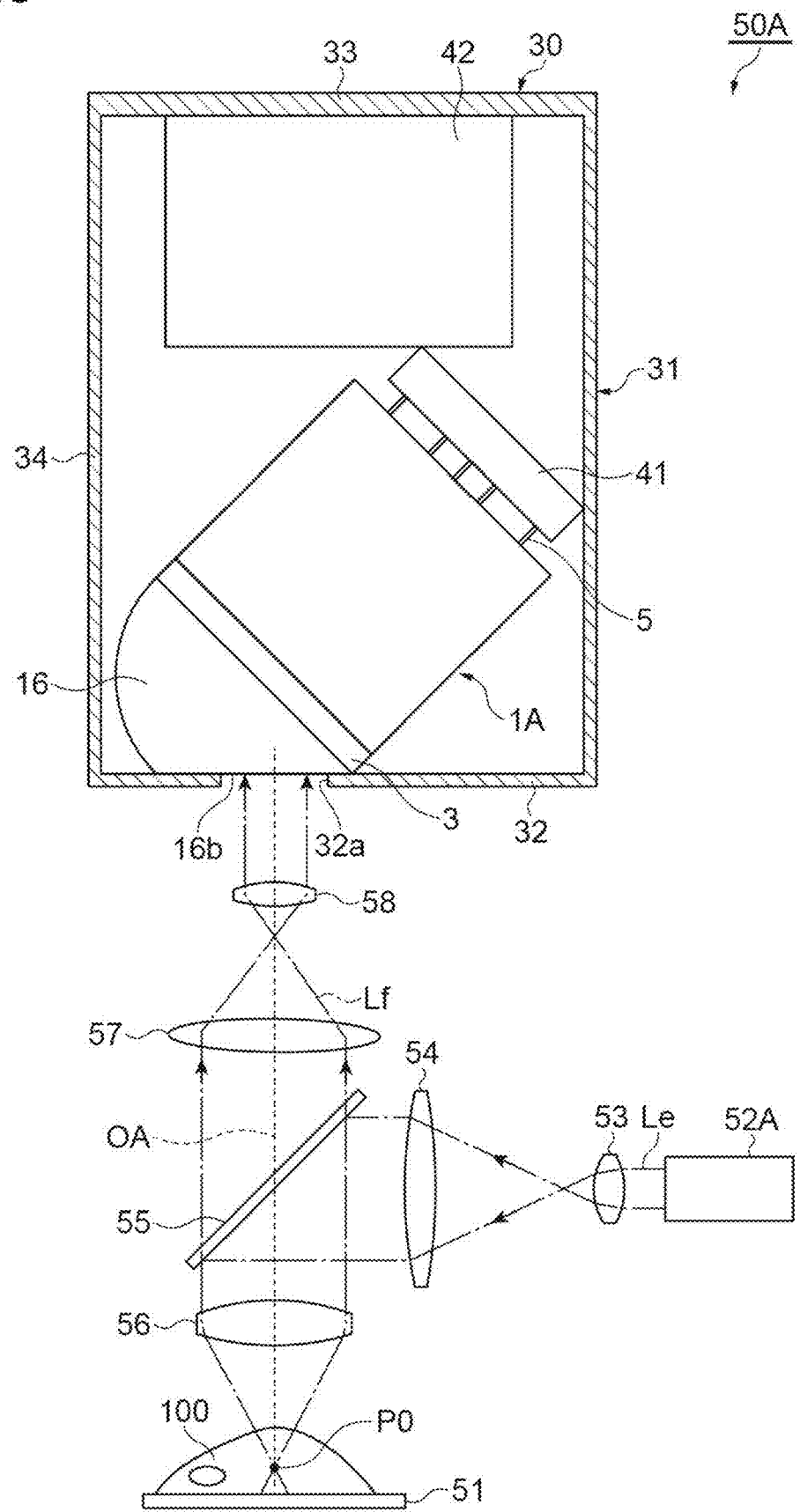
FIG. 9 is a schematic configuration diagram of a first example of an optical device.

As illustrated in FIG. 9, an optical device 50A according to a first example is a two-photon laser microscope (two-photon excitation microscope or two-photon microscope) which irradiates a sample 100 placed on a sample stage 51 with excitation light Le and detects weak fluorescence Lf generated from the sample 100 at a focal position P0 of an objective lens 56.

The optical device 50A includes the sample stage 51, a laser irradiation unit 52A (light source), a condenser lens 53, a collimator lens 54, a dichroic mirror 55, an objective lens 56, a condenser lens 57, a collimator lens 58, and the electron tube module 30 detecting the fluorescence Lf. However, the collimator lens 58 may be omitted.

The sample stage 51 is a portion on which the sample 100 of the measurement target is placed. The sample stage 51 is, for example, a movable stage. The sample 100 is, for example, a biological sample and emits the fluorescence Lf by being irradiated with the excitation light Le. The laser irradiation unit 52A is a light source which outputs the excitation light Le (light) irradiating the sample 100 of the measurement target. The excitation light Le output by the laser irradiation unit 52A is near-infrared ultrashort pulse laser light. In this embodiment, as an example, the excitation light Le output by the laser irradiation unit 52A is parallel light. The condenser lens 53 is disposed on the optical path of the excitation light Le output from the laser irradiation unit 52A and converts the excitation light Le into a point light source by condensing the excitation light Le. The collimator lens 54 is disposed at the rear stage in relation to the condenser lens 53 and parallelizes (collimates) the excitation light Le. The dichroic mirror 55 is a mirror member formed so that the excitation light Le is reflected and the fluorescence Lf is transmitted and is disposed at the rear stage of the collimator lens 54. The excitation light Le which becomes parallel light by the collimator lens 54 is reflected at the dichroic mirror 55, passes through the objective lens 56, and reaches the sample 100. Accordingly, two-photon excitation is generated only at the focal position P0 of the objective lens 56 and the fluorescence Lf is generated from the sample 100 at the focal position P0.

The fluorescence Lf generated in the sample 100 follows a path opposite to the excitation light Le, passes through the objective lens 56, and is transmitted through the dichroic mirror 55. Then, the fluorescence Lf is condensed by the condenser lens 57. The fluorescence Lf condensed by the condenser lens 57 is parallelized by the collimator lens 58 disposed behind the condensing point of the condenser lens 57. As illustrated in FIG. 9, the electron tube module 30 is disposed at the rear stage of the collimator lens 58 so that the optical axis OA of the fluorescence Lf generated in the sample 100 is orthogonal to the light incident surface 16b of the prism 16. Further, the fluorescence Lf is parallelized by the collimator lens 58 so as to enter the opening 32a of the ceiling wall 32. The fluorescence Lf which is parallelized in this way is incident to the light incident surface 16b of the prism 16 through the opening 32a and is detected by the electron tube module 30.

The optical device 50A has the same effect as that of the electron tube module 30 by including the electron tube module 30 as a detector which detects the detection target light (here, fluorescence Lf). That is, it is possible to effectively improve the quantum efficiency of the photocathode 8 in the electron tube 1A by using the prism 16. As a result, it is possible to appropriately detect electrons in response to the fluorescence Lf in the anode 10 of the electron tube 1A. Further, as illustrated in FIG. 9, since the electron tube 1A is accommodated in the casing 31, the electron tube module 30 can be disposed in an accommodation state so that the central axis AX1 (see FIG. 8) of the casing 31 is parallel to the optical axis OA of the detection target light (the fluorescence Lf) in the optical device 50A.

Further, in the optical device 50A, the electron tube 1A may be configured so that a part or all of the fluorescence Lf (the detection target light) incident to the photocathode 8 through the prism 16 and the light transmitting substrate 3 is totally reflected at the interface between the photocathode 8 and the vacuum space S. Specifically, the electron tube 1A may be configured and disposed in the optical device 50A so that the above-described equation (3) is established for the fluorescence Lf as the detection target light L in FIG. 5. In this case, it is possible to increase the absorption amount of the fluorescence Lf in the photocathode 8 by the fluorescence Lf totally reflected at the interface between the photocathode 8 and the vacuum space S and returning to the photocathode 8 again and to effectively improve the quantum efficiency of the photocathode 8.

Second Example of Optical Device

Figure 10:
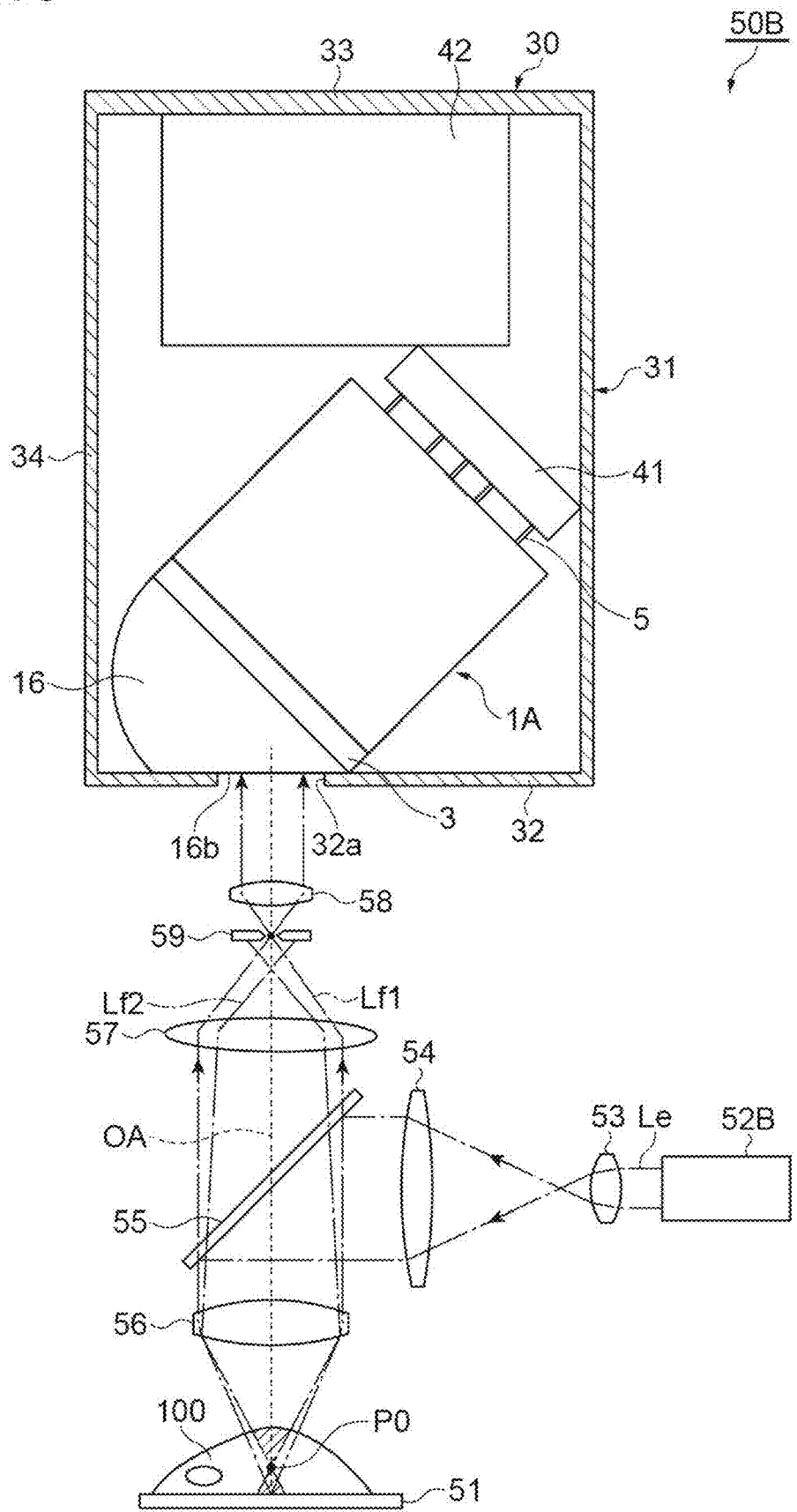
FIG. 10 is a schematic configuration diagram of a second example of an optical device.

As illustrated in FIG. 10, an optical device 50B according to a second example is a confocal laser microscope which irradiates the sample 100 (measurement target) placed on the sample stage 51 with the excitation light Le and detects weak fluorescence Lf1 generated from the sample 100 at the focal position P0 of the objective lens 56. The optical device 50B is different from the optical device 50A in that a laser irradiation unit 52B is provided instead of the laser irradiation unit 52A and a pin hole 59 is further provided and the other configurations are the same as those of the optical device 50A.

Specifically, the excitation light Le output by the laser irradiation unit 52B is a visible ultraviolet laser. In this case, when the sample 100 is irradiated with the excitation light Le, fluorescence is generated from an irradiation region including a region other than the focal position P0 of the objective lens 56. In FIG. 10, the fluorescence Lf1 indicates the fluorescence generated at the focal position P0 and the fluorescence Lf2 indicates the fluorescence generated at a position (here, as an example, in the vicinity of the contact position between the sample 100 and the sample stage 51) other than the focal position P0. In this way, in the optical device 50B, since the fluorescence Lf2 is also generated in a region other than the focal position P0, the pin hole 59 through which only the fluorescence Lf1 generated from the focal position P0 passes is provided at the rear stage of the condenser lens 57. Accordingly, only the fluorescence Lf1 passes through the pin hole 59 and is guided to the incident surface (the light incident surface 16b of the prism 16) of the electron tube module 30 through the collimator lens 58. That is, the pin hole 59 shields the fluorescence Lf2 generated in a region other than the focal position P0. Also in the optical device 50B, the same effect as that of the optical device 50A is obtained.

Third Example of Optical Device

Figure 11:
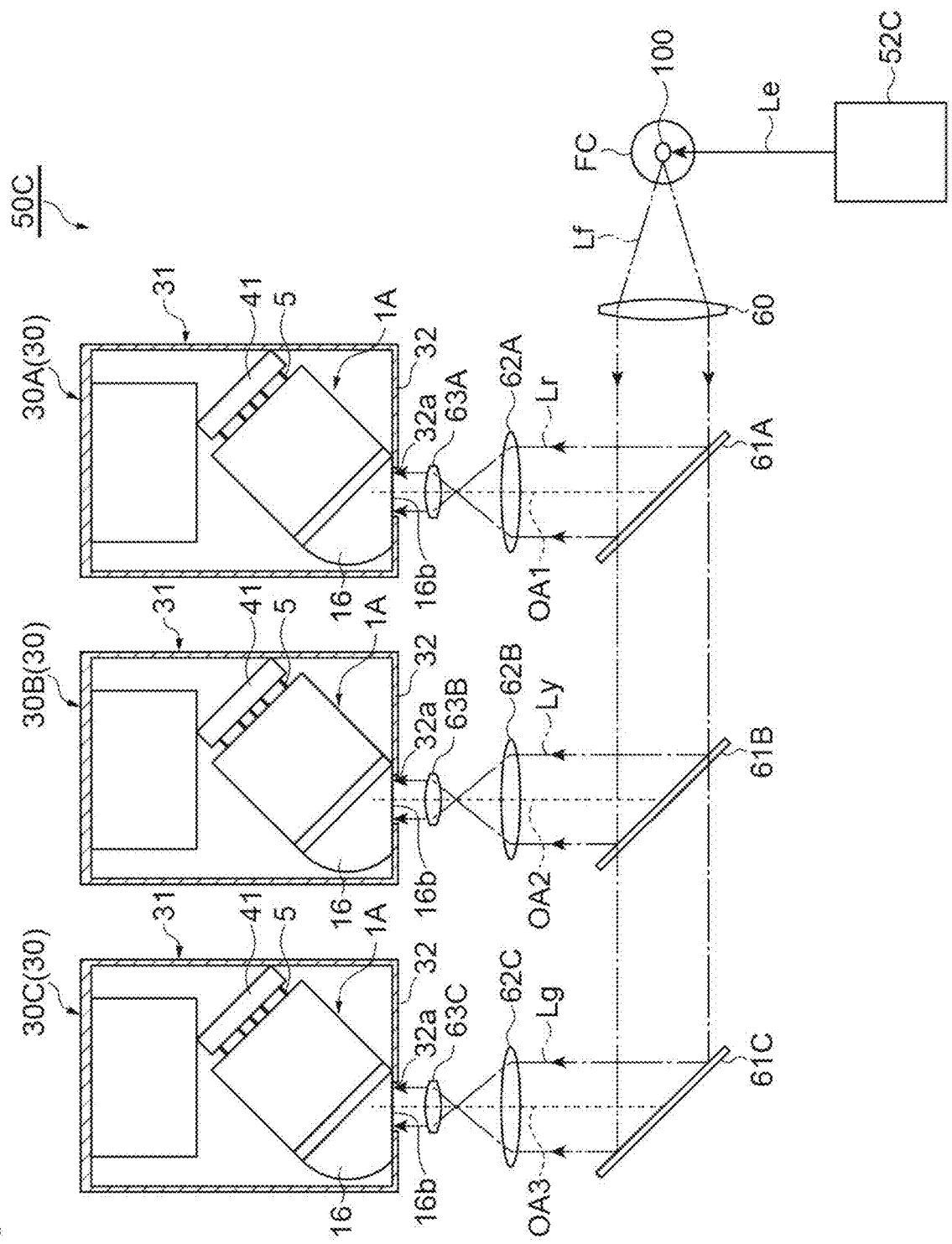
FIG. 11 is a schematic configuration diagram of a third example of an optical device.

As illustrated in FIG. 11, an optical device 50C according to a third example is a device (flow cytometer) that performs flow cytometry. The optical device 50C includes a laser irradiation unit 52C, a flow cell FC, a collimator lens 60, a plurality of (here, as an example, three) dichroic mirrors 61A, 61B, and 61C, a plurality of condenser lenses 62A, 62B, and 62C, a plurality of collimator lenses 63A, 63B, and 63C, and a plurality of electron tube modules 30A, 30B, and 30C. However, the collimator lenses 63A, 63B, and 63C may be omitted.

The flow cell FC is a device that distributes a sample solution including the sample 100 such as a plurality of cells to be measured. The flow cell FC has a function of aligning the sample 100 in the sample solution so that the samples 100 sequentially flow one by one. The laser irradiation unit 52C is configured to irradiate a predetermined irradiation position of the flow cell FC with the excitation light Le (here, as an example, a 488 nm argon laser). Accordingly, each of the samples 100 flowing through the flow cell FC and passing through the irradiation position is sequentially irradiated with the excitation light Le. When the sample 100 is irradiated with the excitation light Le in this way, the fluorescence Lf is generated in the sample 100.

The collimator lens 60 parallelizes the fluorescence Lf generated in the sample 100. The dichroic mirrors 61A, 61B, and 61C are disposed in this order at the rear stage of the collimator lens 60. Here, as an example, the dichroic mirror 61A of the first stage is configured to reflect the red light Lr and transmit light having a shorter wavelength than the red light Lr. The dichroic mirror 61B of the second stage disposed at the rear stage of the dichroic mirror 61A is configured to reflect the yellow light Ly in the light transmitted through the dichroic mirror 61A and transmit light having a shorter wavelength than the yellow light Ly. The dichroic mirror 61C of the third stage disposed at the rear stage of the dichroic mirror 61B is configured to reflect the green light Lg in the light transmitted through the dichroic mirror 61B and transmit light having a shorter wavelength than the green light Lg.

The condenser lens 62A, the collimator lens 63A, and the electron tube module 30A are disposed on the optical path of the red light Lr reflected by the dichroic mirror 61A. That is, the dichroic mirror 61A, the condenser lens 62A, the collimator lens 63A, and the electron tube module 30A constitute an optical system that detects the red light Lr included in the fluorescence Lf. The electron tube module 30A is disposed at the rear stage of the collimator lens 63A so that the optical axis OA1 of the red light Lr reflected by the dichroic mirror 61A is orthogonal to the light incident surface 16b of the prism 16. The red light Lr is parallelized by the condenser lens 62A and the collimator lens 63A so as to enter the opening 32a of the ceiling wall 32. The red light Lr parallelized in this way is incident to the light incident surface 16b of the prism 16 through the opening 32a and is detected by the electron tube module 30A.

The condenser lens 62B, the collimator lens 63B, and the electron tube module 30B are disposed on the optical path of the yellow light Ly reflected by the dichroic mirror 61B. That is, the dichroic mirror 61B, the condenser lens 62B, the collimator lens 63B, and the electron tube module 30B constitute an optical system that detects the yellow light Ly included in the fluorescence Lf. The electron tube module 30B is disposed at the rear stage of the collimator lens 63B so that the optical axis OA2 of the yellow light Ly reflected by the dichroic mirror 61B is orthogonal to the light incident surface 16b of the prism 16. The yellow light Ly is parallelized by the condenser lens 62B and the collimator lens 63B so as to enter the opening 32a of the ceiling wall 32. The yellow light Ly parallelized in this way is incident to the light incident surface 16b of the prism 16 through the opening 32a and is detected by the electron tube module 30B.

The condenser lens 62C, the collimator lens 63C, and the electron tube module 30C are disposed on the optical path of the green light Lg reflected by the dichroic mirror 61C. That is, the dichroic mirror 61C, the condenser lens 62C, the collimator lens 63C, and the electron tube module 30C constitute an optical system that detects the green light Lg included in the fluorescence Lf. The electron tube module 30C is disposed at the rear stage of the collimator lens 63C so that the optical axis OA3 of the green light Lg reflected by the dichroic mirror 61C is orthogonal to the light incident surface 16b of the prism 16. The green light Lg is parallelized by the condenser lens 62C and the collimator lens 63C so as to enter the opening 32a of the ceiling wall 32. The green light Lg which is parallelized in this way is incident to the light incident surface 16b of the prism 16 through the opening 32a and is detected by the electron tube module 30C.

Although three optical devices 50A, 50B, and 50C have been described above as examples of an optical device including an electron tube (here, an electron tube module), the configuration of the optical device is not limited to the above. For example, in the optical devices 50A, 50B, and 50C described above, an electron tube 1A that is not housed in the casing 31 may be provided instead of the electron tube module 30 as a portion that detects the detection target light. Further, the electron tube 1A, 1B, or the electron tube module 30 may be incorporated into an optical device other than the optical devices 50A, 50B, and 50C exemplified in the present disclosure. That is, the electron tube 1A, 1B, or the electron tube module 30 may be used for applications other than the two photon laser microscope, the confocal laser microscope, and the flow cytometer. The detection target light may be guided to a light incident portion (light incident surface 16b) of the prism 16 via a light guide body such as an optical fiber, for example, without using an optical system as in the examples of FIGS. 9 to 11.

[Modification]

Although one embodiment of the present disclosure has been described above, the present disclosure is not limited to the above-described embodiment. For example, the material and shape of each component are not limited to those described above, and various materials and shapes may be employed. For example, the shape of the prism is not limited to the prism 16 of the above-described embodiment. Some modifications of the prism will be described below.

(First Modification of Prism)

Figure 12:
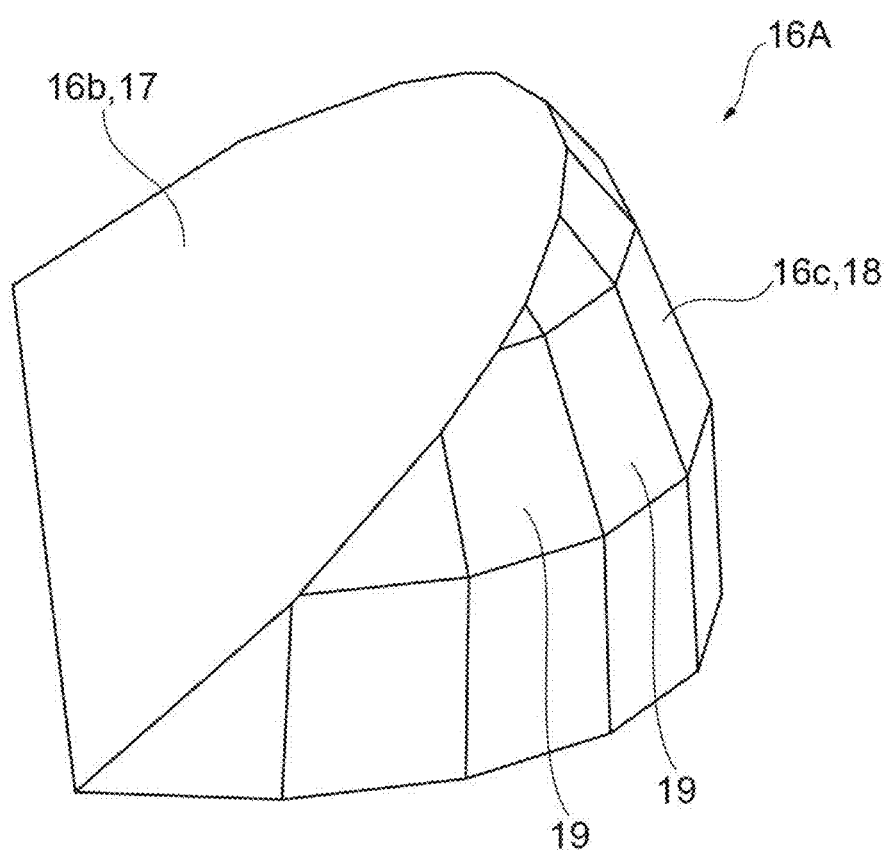
FIG. 12 is a perspective view showing a first modification of the prism.

FIG. 12 is a perspective view showing a prism 16A according to a first modification. In the prism 16A, the curved surface shape of the light reflecting surface 16c is a curved surface shape configured in a pseudo manner by a plurality of plane portions 19. More particularly, the light reflecting surface 16c is formed by a plurality of plane portions 19. That is, the light reflecting surface 16c is formed by connecting a plurality of plane portions 19 to each other. In this case, since the light reflecting surface 16c can be formed only by a process of linearly cutting the prism member, the process becomes easy. The number of plane portions 19 constituting the light reflecting surface 16c, and the shape and size of each plane portion 19 are not limited to a specific form. By reducing the size of each plane portion 19 and increasing the number of plane portions 19 constituting the light reflecting surface 16c, a curved surface shape with a high degree of approximation can be obtained.

(Second Modification of Prism)

Figure 13:
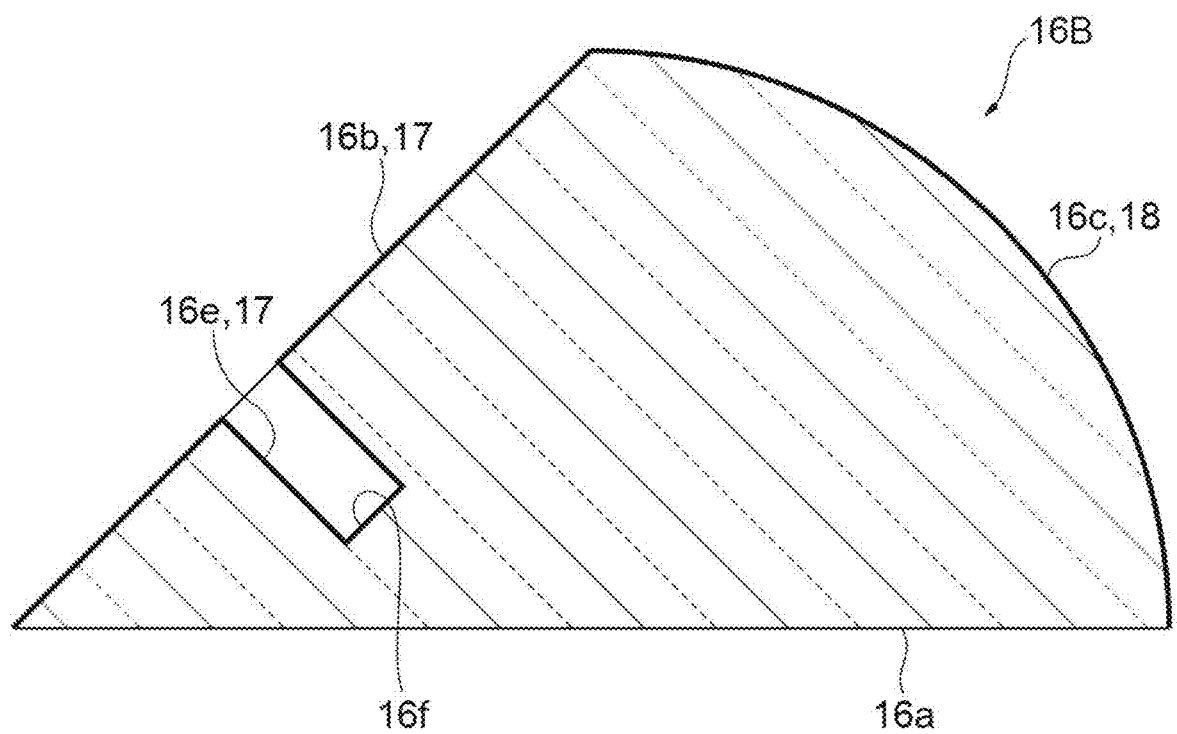
FIG. 13 is a cross-sectional view showing a second modification of the prism.

FIG. 13 is a cross-sectional view illustrating a prism 16B according to a second modification. The prism 16B differs from the prism 16 in that a concave portion 16e opening to a portion of the light incident surface 16b is formed. The concave portion 16e is, for example, a non-through hole having a cylindrical cross section. In the prism 16B, when the detection target light is output from the front end portion of a light guide such as an optical fiber (i.e., when the front end portion of the optical fiber serves as the light source), the front end portion of the optical fiber is inserted into the concave portion 16e, so that the distance between the light source and the photocathode 8 can be further reduced. In such a prism 16B, the light incident portion is constituted by the concave portion 16e. More particularly, the bottom surface 16f of the concave portion 16e functions as the light incident portion to which light is incident. Although the antireflection film 17 is provided on the entire light incident surface 16b in the prism 16B, the antireflection film 17 may be provided on only the bottom surface 16f (light incident portion) of the concave portion 16e in a case where light is incident to only the bottom surface 16f as described above. Further, in the prism 16B, the bottom surface 16f is formed in a flat shape (flat surface), but the bottom surface 16f may be formed in an inwardly convex curved surface shape or an outwardly convex curved surface shape. According to the prism 16B, the light source (here, the front end portion of the optical fiber) is caused to enter the concave portion 16e, and thus the light source can be brought closer to the photocathode 8.

(Third Modification of Prism)

Figure 14:
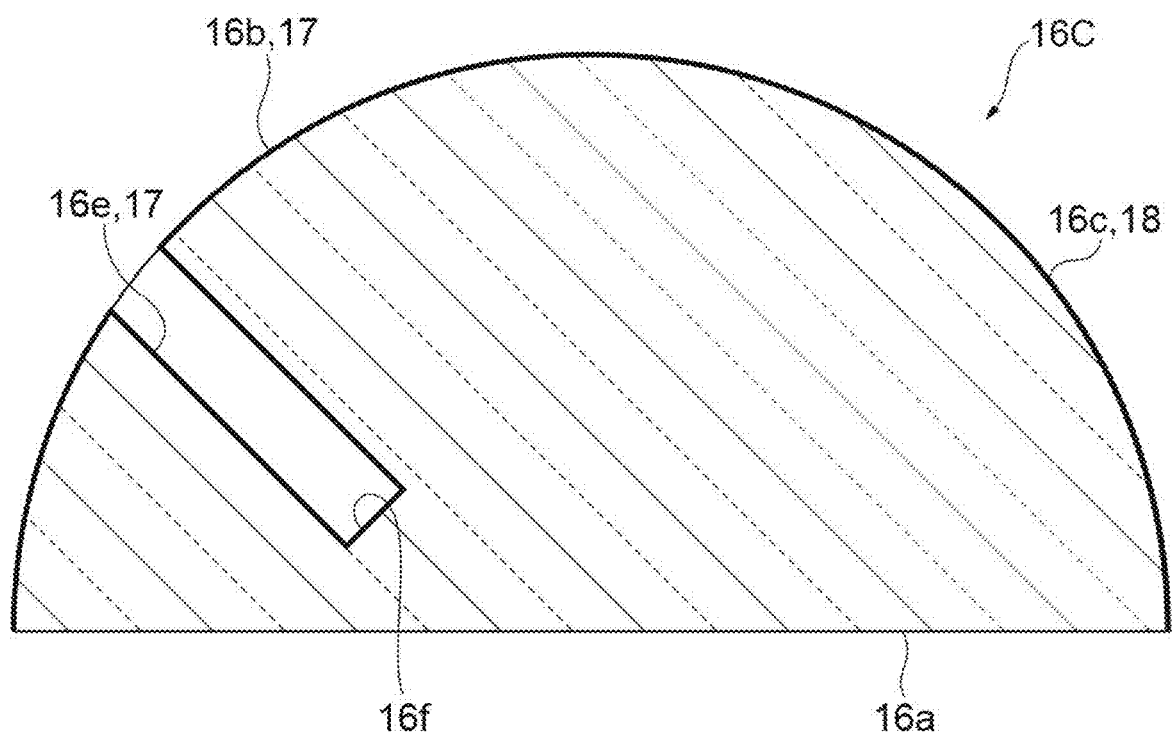
FIG. 14 is a cross-sectional view showing a third modification of the prism.

FIG. 14 is a cross-sectional view showing a prism 16C according to a third modification. The prism 16c differs from the prism 16B in that the light incident surface 16b has a curved surface shape that is continuous with the light reflecting surface 16c. That is, the prism 16C is obtained by forming the concave portion 16e on a part of the light incident surface 16b of a hemispherical prism. With such a configuration, the same effect as that of the prism 16B can be obtained.

(Fourth Modification of Prism)

Figure 15:
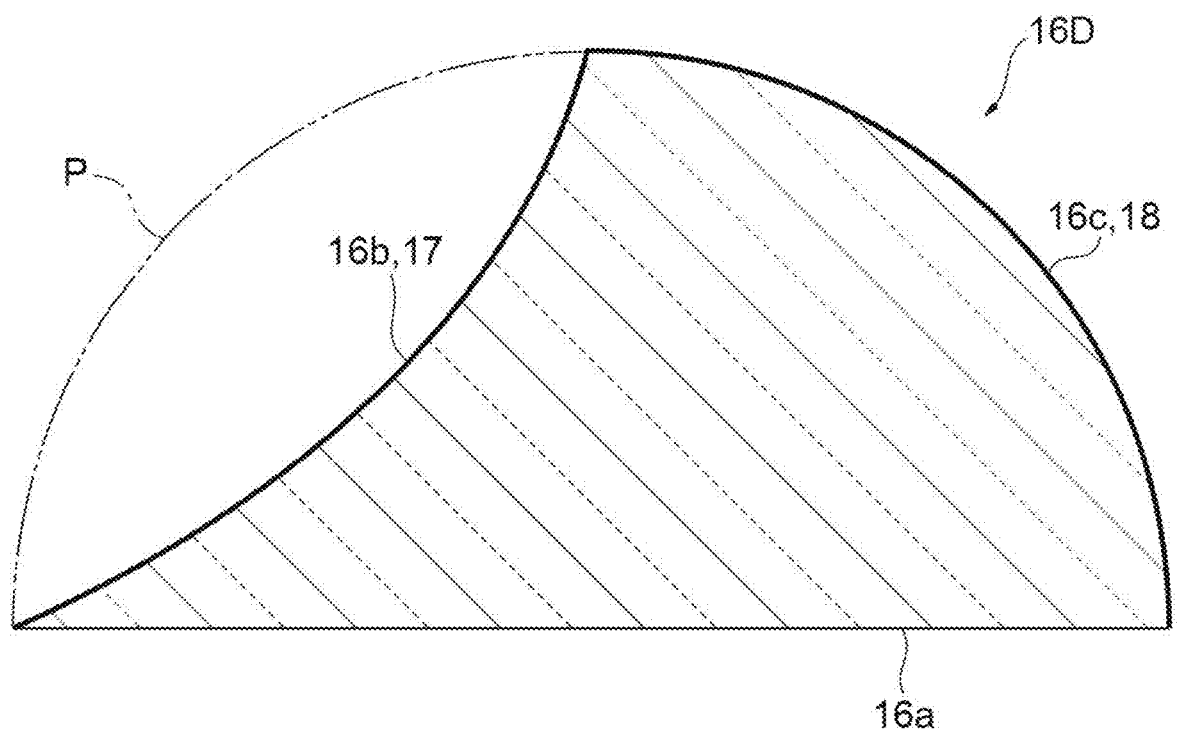
FIG. 15 is a cross-sectional view showing a fourth modification of the prism.

FIG. 15 is a cross-sectional view showing a prism 16D according to a fourth modification. The prism 16D differs from the prism 16 in that the light incident surface 16b is not a flat surface but has an inwardly convex curved surface shape. According to such a prism 16D, by bringing the light source close to the light incident surface 16b, the interval between the light source and the photocathode 8 can be made shorter than that in the case of using the prism 16.

(Fifth Modification of Prism)

Figure 16:
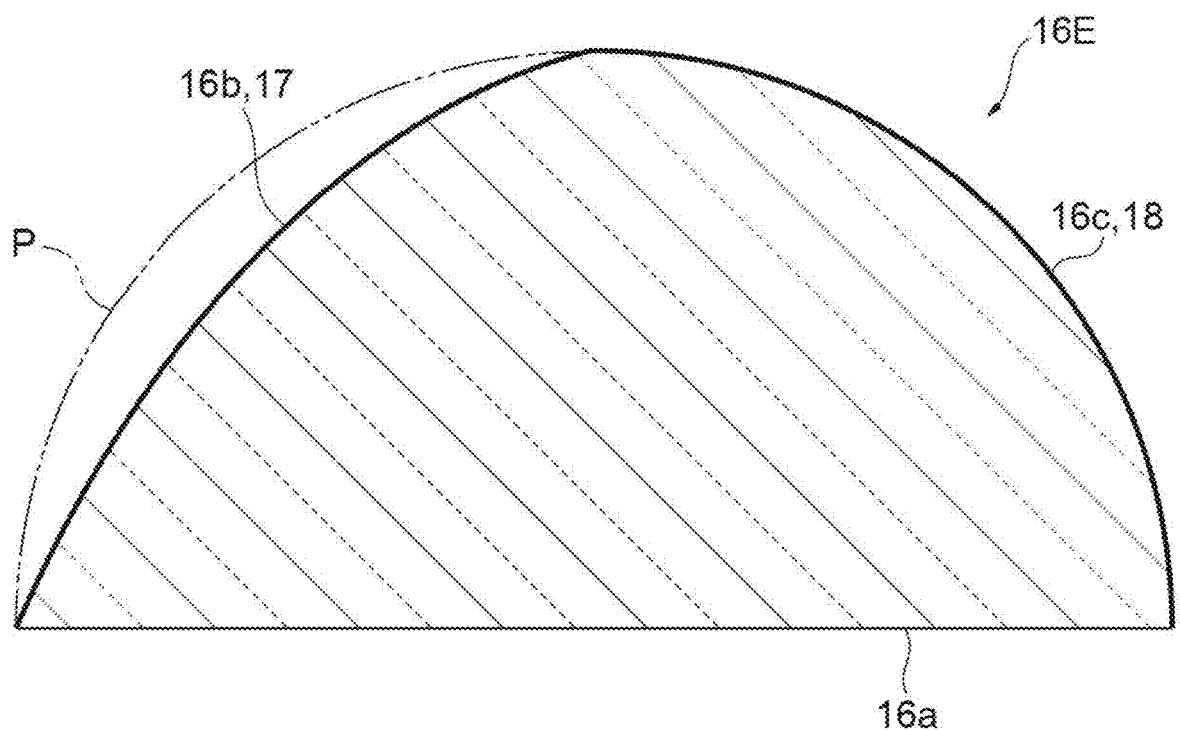
FIG. 16 is a cross-sectional view showing a fifth modification of the prism.

FIG. 16 is a cross-sectional view showing a prism 16E according to a fifth modification. The prism 16E differs from the prism 16 in that the light incident surface 16b is not a flat surface but has an outwardly convex curved surface shape. Note that the radius of curvature of the light incident surface 16b is set within a range that falls inside the imaginary spherical surface P. According to such a prism 16E, for example, in a case where the detection target light incident to the light incident surface 16b is parallel light, it is possible to condense the parallel light toward a substantially central position of the photocathode 8.

In addition, as an example of the electron tube, an electron tube 1A or 1B (that is, a photomultiplier tube or an HPD) including an electron multiplication function (the electron multiplying unit 9 in the first embodiment or the semiconductor element 27 in the second embodiment) has been illustrated, but such an electron multiplication function is not essential in the electron tube. That is, the electron tubes 1A and 1B may be configured as a photoelectric tube (photoelectric conversion tube) including the photocathode 8 and an anode that directly detects photoelectrons emitted from the photocathode 8 in the vacuum container.

REFERENCE SIGNS LIST 1A, 1B electron tube; 3 light transmitting substrate; 3a inner surface; 3b outer surface; 7, 20 vacuum container; 8 photocathode; 9 electron multiplying unit; 10 anode (electron detector); 16 prism; 16a bottom surface; 16b light incident surface (light incident portion); 16c. light reflecting surface; 16d side surface; 16e concave portion (light incident portion); 17 antireflection film; 18 reflection film; 27 semiconductor element (electron detector); 30, 30A, 30B, 30C electron tube module; 31 casing; 32 ceiling wall (wall portion); 32a opening; 32b outlet surface; 32c inner surface; 50A, 50B, 50C optical device; 52A, 52B, 52C laser irradiation unit (light source); 57, 62A, 62B, 62C condenser lens; 100 sample (measurement target); L detection target light; Le excitation light (light); Lf fluorescence (detection target light); Lr red light (detection target light); Ly yellow light (detection target light); Lg Green light (detection target light); S vacuum space.

The invention claimed is:

1. An electron tube comprising:
   a vacuum container that includes a light transmitting substrate and forms a vacuum space;
   a photocathode provided on an inner surface of the light transmitting substrate facing the vacuum space and configured to emit photoelectrons into the vacuum space in response to light incident through the light transmitting substrate;
   an electron detector provided in the vacuum container and configured to detect electrons derived from the photoelectrons; and
   a prism bonded to an outer surface of the light transmitting substrate opposite to the inner surface,
   wherein the prism includes:
      a bottom surface bonded to the outer surface of the light transmitting substrate;
      a light incident surface having a light incident portion to which light is incident; and
      a light reflecting surface configured to further reflect light, which is incident to the light incident portion and reflected at an interface between the photocathode and the vacuum space, so that the light is incident to the photocathode again,
   the light reflecting surface has an outwardly convex curved surface shape,
   the light incident portion is located inward of an imaginary spherical surface that is along the light reflecting surface, and
   the prism further includes a pair of side surfaces provided between the light incident surface, the light reflecting surface, and the bottom surface, and facing each other with the light incident surface and the light reflecting surface interposed therebetween when viewed from a direction facing the bottom surface.

2. The electron tube according to claim 1, wherein the photocathode is formed in a flat plate shape along the inner surface of the light transmitting substrate.

3. The electron tube according to claim 1, wherein the photocathode is formed on a portion of the inner surface of the light transmitting substrate.

4. The electron tube according to claim 1, wherein the light incident portion is formed in a flat shape.

5. The electron tube according to claim 1, wherein the light incident portion is constituted by an entirety of the light incident surface.

6. The electron tube according to claim 1, wherein at least the light incident portion of the light incident surface is provided with an antireflection film.

7. The electron tube according to claim 1, wherein the light reflecting surface is provided with a reflection film.

8. The electron tube according to claim 1, further comprising an electron multiplying unit provided in the vacuum container to multiply the photoelectrons.

9. The electron tube according to claim 1, wherein the electron detector is a semiconductor element configured to multiply the photoelectrons.

10. An electron tube module comprising:
the electron tube according to claim 1; and
a casing configured to accommodate the electron tube, wherein
the casing has a wall portion formed with an opening, and
the electron tube is arranged in the casing so that light introduced from the opening is incident to the light incident surface.

11. The electron tube module according to claim 10, wherein
the light incident surface is formed in a flat shape and arranged to be parallel to the wall portion.

12. An optical device comprising:
the electron tube according to claim 1; and
a light source configured to output light with which a measurement target is irradiated, wherein
the electron tube is disposed such that detection target light generated by irradiating the measurement target with the light is incident to the light incident surface.

13. The optical device according to claim 12, wherein the electron tube is configured such that a part or all of the detection target light incident to the photocathode through the prism and the light transmitting substrate is totally reflected at an interface between the photocathode and the vacuum space.

14. An electron tube comprising:
a vacuum container that includes a light transmitting substrate and forms a vacuum space;
a photocathode provided on an inner surface of the light transmitting substrate facing the vacuum space and configured to emit photoelectrons into the vacuum space in response to light incident through the light transmitting substrate;
an electron detector provided in the vacuum container and configured to detect electrons derived from the photoelectrons; and
a prism bonded to an outer surface of the light transmitting substrate opposite to the inner surface,
wherein the prism includes:
a bottom surface bonded to the outer surface of the light transmitting substrate;
a light incident surface having a light incident portion to which light is incident; and
a light reflecting surface configured to further reflect light, which is incident to the light incident portion and reflected at an interface between the photocathode and the vacuum space, so that the light is incident to the photocathode again,
the light reflecting surface has an outwardly convex curved surface shape,
the light incident portion is located inward of an imaginary spherical surface that is along the light reflecting surface, and
the curved surface shape of the light reflecting surface is a curved surface shape configured in a pseudo manner by a plurality of plane portions.

15. An electron tube comprising:
a vacuum container that includes a light transmitting substrate and forms a vacuum space;
a photocathode provided on an inner surface of the light transmitting substrate facing the vacuum space and configured to emit photoelectrons into the vacuum space in response to light incident through the light transmitting substrate;
an electron detector provided in the vacuum container and configured to detect electrons derived from the photoelectrons; and
a prism bonded to an outer surface of the light transmitting substrate opposite to the inner surface,
wherein the prism includes:
a bottom surface bonded to the outer surface of the light transmitting substrate;
a light incident surface having a light incident portion to which light is incident; and
a light reflecting surface configured to further reflect light, which is incident to the light incident portion and reflected at an interface between the photocathode and the vacuum space, so that the light is incident to the photocathode again,
the light reflecting surface has an outwardly convex curved surface shape,
the light incident portion is located inward of an imaginary spherical surface that is along the light reflecting surface, and
the light incident portion has an outwardly convex curved surface shape.

16. An electron tube comprising:
a vacuum container that includes a light transmitting substrate and forms a vacuum space;
a photocathode provided on an inner surface of the light transmitting substrate facing the vacuum space and configured to emit photoelectrons into the vacuum space in response to light incident through the light transmitting substrate;
an electron detector provided in the vacuum container and configured to detect electrons derived from the photoelectrons; and
a prism bonded to an outer surface of the light transmitting substrate opposite to the inner surface,
wherein the prism includes:
a bottom surface bonded to the outer surface of the light transmitting substrate;
a light incident surface having a light incident portion to which light is incident; and
a light reflecting surface configured to further reflect light, which is incident to the light incident portion and reflected at an interface between the photocathode and the vacuum space, so that the light is incident to the photocathode again, the light reflecting surface has an outwardly convex curved surface shape, the light incident portion is located inward of an imaginary spherical surface that is along the light reflecting surface, and the light incident portion has an inwardly convex curved surface shape.

17. An electron tube comprising:

a vacuum container that includes a light transmitting substrate and forms a vacuum space;

a photocathode provided on an inner surface of the light transmitting substrate facing the vacuum space and configured to emit photoelectrons into the vacuum space in response to light incident through the light transmitting substrate;

an electron detector provided in the vacuum container and configured to detect electrons derived from the photoelectrons; and a prism bonded to an outer surface of the light transmitting substrate opposite to the inner surface, wherein the prism includes:

a bottom surface bonded to the outer surface of the light transmitting substrate;

a light incident surface having a light incident portion to which light is incident; and a light reflecting surface configured to further reflect light, which is incident to the light incident portion and reflected at an interface between the photocathode and the vacuum space, so that the light is incident to the photocathode again, the light reflecting surface has an outwardly convex curved surface shape, the light incident portion is located inward of an imaginary spherical surface that is along the light reflecting surface, and the light incident portion is constituted by a concave portion opening to a portion of the light incident surface.

* * * * *